US008458662B2

(12) United States Patent
Grechanik et al.

(10) Patent No.: US 8,458,662 B2
(45) Date of Patent: *Jun. 4, 2013

(54) TEST SCRIPT TRANSFORMATION ANALYZER WITH ECONOMIC COST ENGINE

(75) Inventors: Mark Grechanik, Chicago, IL (US); Qing Xie, Chicago, IL (US); Chen Fu, Downers Grove, IL (US)

(73) Assignee: Accenture Global Services Limited, Dublin (IE)

( * ) Notice: Subject to any disclaimer, the term of this patent is extended or adjusted under 35 U.S.C. 154(b) by 1452 days.

This patent is subject to a terminal disclaimer.

(21) Appl. No.: 12/038,675

(22) Filed: Feb. 27, 2008

(65) Prior Publication Data
US 2009/0217100 A1 Aug. 27, 2009

(51) Int. Cl.
G06F 9/44 (2006.01)
G06F 3/00 (2006.01)
G06F 3/048 (2006.01)

(52) U.S. Cl.
USPC ........... 717/124; 717/131; 717/168; 717/170; 715/762; 715/763; 715/788; 715/789

(58) Field of Classification Search
USPC .................. 717/124, 131; 715/762, 763, 788, 715/789
See application file for complete search history.

(56) References Cited

U.S. PATENT DOCUMENTS

| | | | |
|---|---|---|---|
| 5,781,720 A | 7/1998 | Parker et al. | |
| 6,216,212 B1 | 4/2001 | Challenger et al. | |
| 6,898,764 B2 | 5/2005 | Kemp | |
| 6,990,654 B2 | 1/2006 | Carroll, Jr. | |
| 7,735,062 B2 * | 6/2010 | de Seabra e Melo et al. | 717/120 |
| 2003/0052917 A1 | 3/2003 | Dubovsky | |
| 2003/0202012 A1 | 10/2003 | Kemp | |
| 2003/0236775 A1 | 12/2003 | Patterson | |
| 2004/0002989 A1 | 1/2004 | Kaminer | |
| 2005/0044508 A1 * | 2/2005 | Stockton | 715/811 |
| 2005/0166094 A1 * | 7/2005 | Blackwell et al. | 714/38 |
| 2005/0204343 A1 | 9/2005 | Kisamore et al. | |
| 2005/0235274 A1 | 10/2005 | Mamou et al. | |
| 2006/0230314 A1 | 10/2006 | Sanjar et al. | |
| 2007/0006043 A1 * | 1/2007 | Pins | 714/38 |
| 2007/0106622 A1 * | 5/2007 | Boomershine et al. | 705/400 |
| 2007/0143327 A1 | 6/2007 | Rivas et al. | |
| 2007/0240116 A1 | 10/2007 | Bangel et al. | |

(Continued)

OTHER PUBLICATIONS

Compuware, The Leader in IT Value, "Accelerate Testing and Deliver High Quality Applications on Time," 2008 Compuware Corporation, 2 pages.

(Continued)

*Primary Examiner* — Emerson Puente
*Assistant Examiner* — Charles Swift
(74) *Attorney, Agent, or Firm* — Brinks Hofer Gilson & Lione

(57) ABSTRACT

An economic engine generates accurate cost estimates for adapting a test script for use against an evolving application. Applications often have complex graphical user interfaces for which the permutations and combinations of GUI elements give rise to an enormous field of potential commands and command sequences to be tested. Furthermore, these applications change over time, rendering prior test scripts unworkable. The economic engine generates cost reports that reliably estimate the resources and time needed to produce new test scripts and test subsequent application versions, while greatly reducing the time, cost, and resource expenditures needed to arrive at subsequent application versions.

18 Claims, 16 Drawing Sheets

U.S. PATENT DOCUMENTS

| | | | |
|---|---|---|---|
| 2007/0271203 | A1 | 11/2007 | Delvat |
| 2008/0027961 | A1* | 1/2008 | Arlitt et al. .................... 707/101 |
| 2008/0281652 | A1* | 11/2008 | Iqbal et al. ........................ 705/7 |
| 2008/0282230 | A1 | 11/2008 | Belvin et al. |

OTHER PUBLICATIONS

Grechanik et al., "Reducing Effort in Script-Based Testing," Accenture Technology Labs, Systems Integration Group, Chicago, Illinois, Nov. 11, 2007, pp. 1-22.

Hewlett-Packard Development Company, "HP Functional Testing Software, BTO Software," 2008, 1 page.

Hewlett-Packard Development Company, HP QuickTest Professional Software, data sheet, 2007, 4 pages.

IBM, "Rational Robot, Features and Benefits," "Rational Software," undated, 1 page.

IBM, "Rational Robot, Overview," "Rational Software," undated, 1 page.

Pierce, Benjamin C., "Types and Programming Languages," The MIT Press, Cambridge, Massachusetts, 2008, ISBN 0-262-16209-1, complete book.

United States Patent and Trademark Office Action dated Sep. 28, 2011 for co-pending U.S. Appl. No. 12/038,672.

United States Patent and Trademark Office Action dated Sep. 29, 2011 for co-pending U.S. Appl. No. 12/038,665.

First Examiner's Report dated Jul. 4, 2011 for co-pending Canadian Patent Application No. 2,653,887.

Memon et al., "Regression Testing of GUIs," *Proceedings of ESEC/FSE'03*, Sep. 1, 2003, pp. 118-127 (10 pages).

First Office Action dated Nov. 16, 2011 for co-pending Chinese Patent Application No. 200910118535.8.

Extended European Search Report dated Feb. 10, 2011 for corresponding European Patent Office Application No. 09250551.0.

Memon et al., "Regression Testing of GUIs," Proceedings of ESEC/FSE '03, Sep. 1-5, 2003, pp. 118-127, Helsinki, Finland, XP-002617924.

Memon et al., "Automating Regression Testing for Evolving GUI Software," *Journal of Software Maintenance and Evolution: Research and Practice*, vol. 17, No. 1, Jan. 1, 2005, pp. 27-64, XP002617925.

Office Action dated Apr. 10, 2012 for co-pending U.S. Appl. No. 12/038,672.

Second Office Action dated May 3, 2012 for co-pending Chinese Patent Application No. 200910118531.X.

First Office Action dated Jun. 24, 2011 for co-pending Chinese Patent Application No. 200910118531.X with English translation.

\* cited by examiner

```
' Test script for the Current GAP GUI to open file, select a number of schools
' (e.g., Acme University, and State University), change the academic scale to 3 for Acme University
' and 2 for State University in the same State identified by coordinate 36, 14 at line 5, and save to a new file L1   Window("StateList").WinObject("Open File").Click 86,12
L2   Window("StateList").Dialog("Open").WinListView("SysListView32").Select "university.data"
L3   Window("StateList").Dialog("Open").WinButton("Open").Click
L4   Window("StateList").WinObject("StateListbox").Click 31,7
L5   Window("StateList").WinObject("Select State").Click 36,14
L6   Window("StateList").WinObject("SchoolListbox").Click 19,22

L7   For School_Constant = J to K

L8   Window("StateList").WinObject("Select School").Click 67, School_Constant
L9   Window("StateList").WinObject("AcadScale").Drag 18,14
L10  Window("StateList").Drop 698,471

L11  If Window("StateList").WinObject("Select School").property("value") = "Acme University" then
L12    Window("StateList").WinObject("AcadScale").Type "3"
L13  Else if Window("StateList").WinObject("Select School").property("value") = "State University" then
L14    Window("StateList").WinObject("AcadScale").Type "2"
L15  End if L16  Window("StateList").WinObject("Save Change").Click 108,7

L17  Next School_Constant

L18  Window("StateList").WinObject("Save File").Click 70,16
L19  Window("StateList").Dialog("Save a Data Record").WinEdit("File name:").Set "university_revise.data"
L20  Window("StateList").Dialog("Save a Data Record").WinButton("Save").Click
```

```
'Test script for the Subsequent GAP GUI to open file, select a number of schools
'(e.g., Acme University, and State University), change the academic scale to 3 for Acme University
'and 2 for State University and save to a new file L1    Window("School").Window("Window").Click 63,15
L2    Window("School").Dialog("Open").WinToolbar("ToolbarWindow32").Press "My Computer"
L3    Window("School").Dialog("Open").WinListView("SysListView32").Activate "Local Disk (C:)"
L4    Window("School").Dialog("Open").WinListView("SysListView32").Activate "University"
L5    Window("School").Dialog("Open").WinComboBox("Files of type:").Select "All files (*.*)"
L6    Window("School").Dialog("Open").WinListView("SysListView32").Select "university.data"
L7    Window("School").Dialog("Open").WinButton("Open").Click
L8    Window("School").WinObject("StateListbox").Click 31,10
L9    Window("School").WinObject("Select State").Click 51,12
L10   Window("School").WinObject("SchoolCombobox").Click 294,14
L11   For School_Constant = J to K
L12     If School_Constant = J then
L13       School_Name == "Acme University"
L14       Acad_Scale == "3"
L15     Elseif School_Constant = K then
L16       School_Name == "State University"
L17       Acad_Scale == "2"
L18     End if
L19     Window("School").WinEdit("Edit").Set School_Name
L20     Window("School").WinEdit("Edit").Type micReturn
L21     Window("School").WinObject("2").Drag 15,12
L22     Window("School").WinObject("Academics (1-5)").Drop 73,2
L23     Window("School").WinObject("2").Type Acad_Scale
L24     Window("School").WinObject("menuStrip1").Click 101,15
L25     Window("School").Window("Window").Click 69,63
L26   Next School_Constant
L27   Window("School").WinObject("menuStrip1").Click 97,12
L28   Window("School").Window("Window").Click 52,54
L29   Window("School").Dialog("Save As").WinComboBox("Save as type:").Select "All files (*.*)"
L30   Window("School").Dialog("Save As").WinEdit("File name:").Set "university_revise2.data"
L31   Window("School").Dialog("Save As").WinEdit("File name:").Type micReturn
```

Figure 11

```
L1  <GUIElement Type="StateList">

L2  <Version>0
L3    <GUIElement Alias="StateList" Version="0">
        <ParentChildIdentifier>XYZ345</ParentChildIdentifier>
        <UniqueID>0x0</UniqueID>
         <HWND>0x170a64</HWND>
         <Location x="87" y="66" width="792" height="672" />
         <Class>WindowsForms10.Window.8.app4</Class>
L9      <Style>0x16cf0000</Style>
L10     <ExStyle>0xc0050900</ExStyle>
.........
L11   <GUIElement Alias="StateList" Version="0">
         <ParentChildIdentifier>XYZ456</ParentChildIdentifier>
          <UniqueID>0x12</UniqueID>
          <HWND>0x170a64</HWND>
          <Location x="117" y="70" width="784" height="638" />
          <Class>WindowsForms10.Window.8.app4</Class>
          <Style>0x16cf0000</Style>
          <ExStyle>0xc0050900</ExStyle>
.........
         </GUIElement>
         </GUIElement>

</Version>

L22  <Version>1

L23  <GUIElement Alias="School" Version="1">
         <ParentChildIdentifier>XYZ567</ParentChildIdentifier>
          <UniqueID>0x0</UniqueID>
          <HWND>0x80bd8</HWND>
          <Location x="116" y="88" width="915" height="594" />
          <Class>WindowsForms10.Window.8.app.0.378734a</Class>
L29     <Style>0x16cf0000</Style>
L30     <ExStyle>0xc0050900</ExStyle>
.....
L31  <GUIElement Alias="School" Version="1">
         <ParentChildIdentifier>XYZ789</ParentChildIdentifier>
          <UniqueID>0x12</UniqueID>
          <HWND>0x80bd8</HWND>
          <Location x="146" y="92" width="907" height="560" />
          <Class>WindowsForms10.Window.8.app.0.378734a</Class>
          <Style>0x16cf0000</Style>
          <ExStyle>0xc0050900</ExStyle>
.........
         </GUIElement>
        </GUIElement>
     </Version>
 </GUIElement>
```

Figure 14

```
<GUIElement Type="SchoolListbox">
  <Version>0
L3 - <GUIElement Alias="SchoolListbox" Version="0">
      <ParentChildIdentifier>XYZ321</ParentChildIdentifier>
      <UniqueID>0x3c2</UniqueID>
      <HWND>0x90b52</HWND>
      <Location x="173" y="486" width="336" height="274" />
      <Class>WindowsForms10.LISTBOX.app4</Class>
      <Style>0x560100c1</Style>
      <ExStyle>0xc0000a00</ExStyle>
 ....
    </GUIElement>
  </Version>

L13   <Version>1
L14 - <GUIElement Alias="SchoolCombobox" Version="1">
       <ParentChildIdentifier>XYZ654</ParentChildIdentifier>
       <UniqueID>0xa8</UniqueID>
       <HWND>0x90e66</HWND>
       <Location x="248" y="653" width="299" height="24" />
       <Class>WindowsForms10.COMBOBOX.app.0.378734a</Class>
       <Style>0x56010242</Style>
       <ExStyle>0xc0000800</ExStyle>
  ..........
     </GUIElement>

</Version>
```

Figure 15

TEST SCRIPT TRANSFORMATION ANALYZER WITH ECONOMIC COST ENGINE

CROSS REFERENCE TO RELATED APPLICATIONS

This application is related to following applications, all filed on the same day:
U.S. patent application Ser. No. 12/038,665, filed Feb. 27, 2008;
U.S. patent application Ser. No. 12/038,672, filed Feb. 27, 2008;
U.S. patent application Ser. No. 12/038,676, filed Feb. 27, 2008;
U.S. patent application Ser. No. 12/038,661, filed Feb. 27, 2008; and
U.S. patent application Ser. No. 12/038,658, filed Feb. 27, 2008.

BACKGROUND OF THE INVENTION

1. Technical Field

This disclosure relates to analysis and generation of cost estimates for testing graphical user interface applications, and in particular relates to estimating the costs to transform a prior test script and to test new application versions.

2. Related Art

The relentless pace of advancing technology has given rise to complex computer software applications to help automate almost every aspect of day-to-day existence. Today applications exist to assist with writing novels to filing income tax returns to analyzing historical trends in baby names. One nearly ubiquitous feature of these applications is that they employ graphical user interfaces (GUIs). Another nearly ubiquitous aspect is that the GUI APplications (GAPs) require thorough testing prior to release.

Nevertheless, in the past it has been easier to implement the GUI to the application than to thoroughly test the GAP. For GAPs of any significant complexity, the permutations and combinations of GUI elements gives rise to an enormous field of potential commands and command sequences that could have bugs of any severity, from insignificant to critical failure. Exacerbating the problem is that application developers are under pressure to continually add new features, update the GUI, and release new versions of applications. As a result, even if a test script for a prior version of a GAP were adequate, it is rarely the case that the original test script can adequately test the subsequent revised application.

Manually testing large-scale enterprise GAPs is tedious, error prone, incomplete, and laborious. Nontrivial GAPs contain hundreds of GUI screens that in turn contain thousands of GUI objects. In order to automate testing of GAPs, test engineers write programs using scripting languages (e.g., JavaScript and VBScript), and these testing scripts drive GAPs through different states by mimicking users who interact with these GAPs by performing actions on their GUI objects. Often test scripts simulate users of GAPs, and their statements access and manipulate GUI objects of these GAPs. For example, the statement:

VbWindow("Login").VbEdit("txtAgentsName").Set "Shawn"

locates a window whose caption is Login and that is created by a Visual Basic-based control, then it locates a text box whose name is txtAgentsName that is a GUI object whose parent is the login window. By calling the method Set with the parameter "Shawn", the value of the text box is set to "Shawn".

Commercial tools such as Quick Test Pro (QTP), Rational Robot, and Compuware Test Partner help generate test scripts by tracking pointing of a cursor at GUI objects and performing desired actions. These tools generate scripting code that can replay captured user actions. The generated code serves as a skeleton for creating scripts to automate script testing. Test engineers add code to the generated scripts so that these scripts can replay using different input values thereby exercising the functionality of the GAP.

Expanding test scripts with manually written code to automate tests makes the test script more complex, difficult to understand, maintain, and evolve. Similarly, estimating the costs to expand test scripts and to perform tests using the expanded test scripts is a difficult and highly technical challenge. Although it is known in advance that the test scripts access and manipulate GUI elements, it is not clear how to detect operations at compile time that lead to runtime errors. Using API calls exported by testing platforms remains a primary mode of accessing and manipulating GUI objects of GAPs, and these API calls lead to various run-time errors in the test scripts. For example, test personnel may use platform API calls incorrectly in the test script source code thereby accessing GUI elements that test personnel did not intend to access.

It is difficult to check test scripts for potential flaws caused by third party API calls that lead to incorrect tests and runtime errors in the test scripts. It is also a difficult technical challenge to estimate the costs in time and resources and time to test a subsequent revised application since these test scripts should be modified to adapt to changes in the GAPs. Furthermore, there are fundamental problems with using API calls to access and manipulate GUI objects. First, the API calls take names and property values of GUI objects as string input parameter variables. The values of these input parameters are often known only at runtime, making it impossible to apply sound checking algorithms. Second, testing platforms export dozens of different API calls, and high complexity of these API calls makes it difficult for programmers to understand which API calls to use and how to combine them to access and manipulate GUI objects. These problems lead to a wide range of bugs in the test scripts, many of which are difficult to detect during the inspection of the test script source code.

A further problem arises because application requirement specifications include high-level concepts that describe GAPs, specifically its GUI objects. Unfortunately, tracing GUI objects of GAPs to these high-level concepts is a difficult problem because programmers poorly document these traces or do not document them at all. Accordingly, when test personnel create GAPs, they spend considerable time to understand how to use these GAPs by reading documentation and talking to subject matter experts. This crucial knowledge is often lost after test personnel are reassigned to other tasks or quit the company.

One of the perceived benefits of existing approaches to creating test scripts is that type checking is not required since the script code is generated directly from GUIs. For example, given certain GUI objects in a GAP, a testing tool can produce corresponding statements that navigate to these objects using API calls with string parameters that describe their properties. However, this perceived benefit in fact gives rise to difficult technical challenges due to semantic inconsistencies between the test script and the GAP. Suppose, for example, that during the maintenance phase the GUI of the GAP changed. The scripting interpreter is not aware of the change and it would run the generated script without producing any compile-time warnings. However, the resulting script either fails at run time or produces incorrect test results because its code attempts to access GUI objects that are either changed or do not exist anymore.

Therefore, a need exists to address the problems noted above and other previously encountered.

SUMMARY

A test script transformation analyzer with economic cost engine ("economic cost engine architecture") generates accurate test script transformation cost reports for applications with graphical user interfaces that change over time. As the applications change, prior test scripts are rendered unworkable. The economic cost engine architecture facilitates estimating the costs to generate new test scripts and use the new test scripts to reliably test subsequent application versions, and may greatly reduce the time, cost, and resource expenditures needed to deploy subsequent application versions. The test script transformation cost reports may identify the costs to generate new test scripts and use the new test scripts to reliably test subsequent application versions.

The economic cost engine architecture may accept as input a GUI difference model and GUI element metadata. The GUI difference model specifies GUI element differences between a current GAP version and a subsequent GAP version. The economic cost engine architecture further includes an economic cost engine that generates a test script transformation cost report. The test script transformation cost report may include the costs to modify script entries in the current test script to obtain a transformed test script and may include the costs to test the subsequent GAP version using the transformed test script. The economic cost engine may generate the test script transformation cost report based on an abstract syntax tree representation of a current test script and the GUI difference model. The economic cost engine may generate the test script transformation cost report based on GAP change specifiers that describe various proposed changes to a current GAP version and current test script. The economic cost engine may also use the GAP change specifiers, the representation of the current test script and current GAP version to generate the test script transformation cost report.

In one implementation, the economic cost engine architecture provides a product and system for test script transformation cost analysis. The architecture generates a test script transformation cost report for a subsequent graphical user interface application (GAP) version arising from a current GAP version. The architecture determines the resources and time needed to produce a transformed test script and perform testing of the subsequent GAP. The economic cost engine architecture includes an economic cost engine that includes a processor, and a memory coupled to the processor. The memory of the economic cost engine includes economic cost model logic operable to receive a GAP change specifier, search an economic model repository for an applicable GUI element change cost rule, and apply the cost rule to obtain a GUI transformation cost. The economic cost engine generates the test script transformation cost report based on the GUI transformation cost.

The test script transformation cost report may include cost estimates to generate a transformed test script for a subsequent GAP version arising from a current GAP version and cost estimates to test the subsequent GAP using the transformed test script. The economic cost model logic receives a GUI difference model and a current test script representation for a current test script for testing the current GAP. The current test script representation includes a test script statement vector that navigates to GUI objects in the current GAP. The economic cost model logic locates, in an object repository, a GUI object entry matching the test script statement vector and locates, in the GUI difference model, a GUI element difference entry matching the GUI object entry. The GUI element difference entry may identify a specific GUI element that matches between a current GAP version and a subsequent GAP version, but that differs in character between the current GAP version and the subsequent GAP version. The economic cost model logic analyzes the GUI element difference entry to determine whether the specific GUI element has changed, and generates one or more corresponding synthetic GAP change specifiers that reflect the change.

The economic cost model logic locates, in an economic models repository, a GUI element change cost rule, using the received GAP change specifiers and/or synthetic GAP change specifiers. The GUI element change cost rules may include change specifier identifiers, system resource utilization identifiers, GUI change cost estimates that indicate estimated time and/or resources needed to complete a change identified by a change specifier identifier, and dependent change specifier identifiers that identify other changes that depend on the change identified by the change specifier identifier. The GUI element change cost rules may further include dependency rankings, quality rankings, complexity rankings and dependent GUI element change costs.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The economic cost engine architecture may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 2 shows a GUI of a current GAP version.

FIG. 3 shows a GUI of a subsequent GAP version.

FIG. 6 shows a current test script.

FIG. 11 shows a transformed test script.

FIG. 14 illustrates another GUI element difference entry.

FIG. 15 show another example GUI element difference entry.

DETAILED DESCRIPTION OF THE PREFERRED EMBODIMENTS

Figure 1:
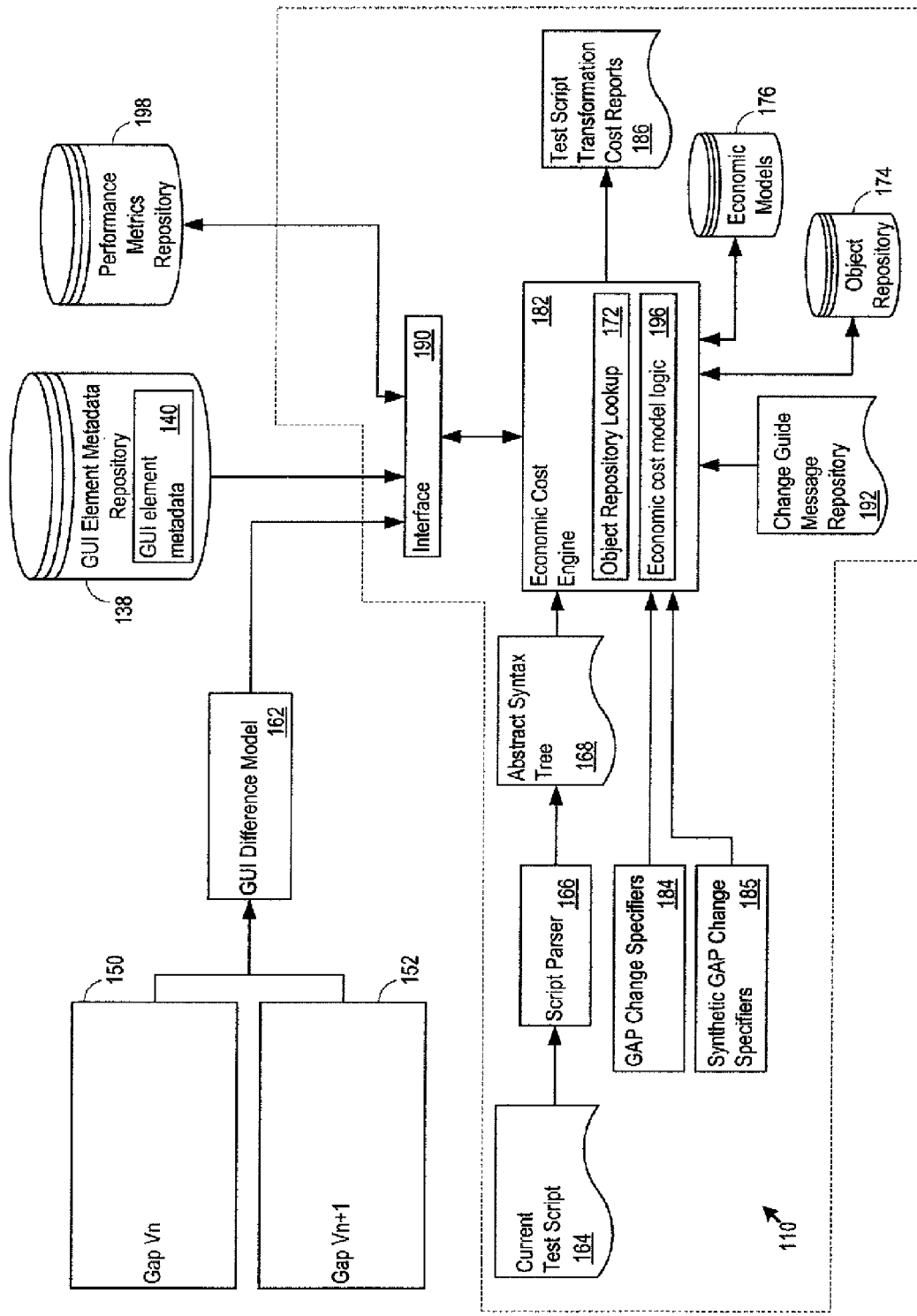
FIG. 1 shows a test script transformation analyzer with economic cost engine architecture.

FIG. 1 shows a test script transformation analyzer with economic cost engine ("economic cost engine architecture") 110. Although detailed descriptions of the features of the economic cost engine architecture 110 will be provided further below, a brief introduction of the economic cost engine architecture 110 will first be presented. In one implementation, the economic cost engine architecture 110 receives a GUI difference model 162 that specifies GUI element differences between a current GAP version 150 and a subsequent GAP version 152. The GUI difference model 162 may be represented as an XML schema. The GUI element difference model 162 may include current and subsequent GAP tree models corresponding to the current GAP version 150 and subsequent GAP version 152. In one implementation, the economic cost engine 182 receives the current GAP tree model from the GUI element difference model 162. In another implementation, the current and subsequent GAP tree models, as well as the GUI difference model 162 are implemented as relational models stored in a database. The economic cost engine architecture 110 employs an interface 190 to receive inputs and communicate with various components, including a GUI element metadata repository 138. The GUI element metadata repository 138 may provide detailed information regarding the GUI elements represented in the GUI difference model 162, the current GAP 150 and the subsequent GAP 152.

The economic cost engine architecture 110 includes a script parser 166 that parses a current test script 164 to obtain an intermediate representation of the current test script 164. The intermediate representation may be an abstract syntax tree (AST) 168 or other representation of the current test script 164. In one implementation, the economic cost engine architecture 110 employs an economic cost engine 182 that analyzes the AST 168 and the GUI difference model 162. The economic cost engine 182 may invoke object repository (OR) lookup logic 172 to search an object repository 174 and the GUI difference model 162 to locate, in the GUI difference model 162, the GUI elements identified by the AST 168. The economic cost engine 182 includes economic cost model logic 196 that uses the GUI elements identified by the AST 168 and GUI difference model 162 to generate synthetic GAP change specifiers 185 that are used to search an economic models 176 repository for corresponding GUI element change cost rule. In one implementation, the economic cost model logic 196 uses GAP change specifiers 184 and synthetic GAP change specifiers 185 to search an economic models 176 repository for corresponding GUI element change cost rule. The economic cost engine 182 applies each GUI element change cost rule to obtain corresponding GUI transformation costs from which a test script transformation cost report 186 is generated, discussed further below. The economic cost engine 182 may also use historical testing metrics from a performance metrics repository 198 and cost reports repository 888 to facilitate obtaining the GUI transformation costs, discussed below.

The economic cost engine 182 may generate test script transformation cost reports 186 based on different combinations of available information, including: 1) GAP change specifiers 184 and/or synthetic GAP change specifiers 185; 2) GAP change specifiers and a current test script 164; 3) GAP change specifiers 184, a current test script 164 and a current GAP version 150 (e.g., a current GAP tree model); 4) a current test script 164 and a GUI difference model 162 with GUI element difference entries; and 5) GAP change specifiers 184, a current test script 164, and a GUI difference model 162. Other combinations of the same or different information may also be employed. The various combinations of available information are used by the economic cost engine 182 to analyze received and/or generate synthetic GAP change specifiers 185 that are used by the economic cost model logic 196 to locate and retrieve GUI transformation costs and generate test script transformation cost reports.

The accuracy of the GUI transformation costs may depend in part on how narrow the variance is between the actual costs and the costs indicated by the GUI transformation costs. A large variance corresponds to a lower accuracy, while a narrow variance corresponds to a higher accuracy. In other words, the accuracy of the GUI transformation costs may correspond to the predictability and/or confidence that the actual costs will reflect the GUI transformation costs. In one implementation, the accuracy of the GUI transformation costs varies due to the granularity of the information received by the economic cost engine 182. For example, the GUI transformation costs generated as a result of the economic cost engine 182 receiving GAP change specifiers 184, a current test script 164, and a GUI difference model 162 may have a higher level of accuracy than the GUI transformation costs generated based solely on GAP change specifiers 184. The economic cost engine 182 may employ various economic models that compensate for the lack of granularity of information provided to the economic cost engine 182, discussed in further detail below.

In one implementation, the economic cost engine 182 receives GAP change specifiers 184, a current test script 164 and a current GAP version 150, and generates a GUI difference model 162. In other words, the economic cost engine 182 may generate the test script transformation cost report 186 based on the AST 168, the current GAP version 150 and GAP change specifiers 184, discussed further below, without relying on an actual subsequent GAP version 152. For example, the economic cost engine 182 analyzes the GAP change specifiers 184 and the current GAP version 150 (e.g., a current GAP tree model received from the GUI difference model 162), and generates synthetic GAP change specifiers 185. In another implementation, the economic cost engine 182 generates the test script transformation cost report 186 based on the GAP change specifiers 184, without analyzing either the GUI difference model 162 and/or the AST 168. The economic cost engine 182 may generate the test script transformation cost reports 186 with change guide messages retrieved from a change guide message repository 192. The change guide messages may provide information regarding the various changes corresponding to the GAP change specifiers 184, GUI element change cost rules and/or GUI difference entries.

Figure 2:
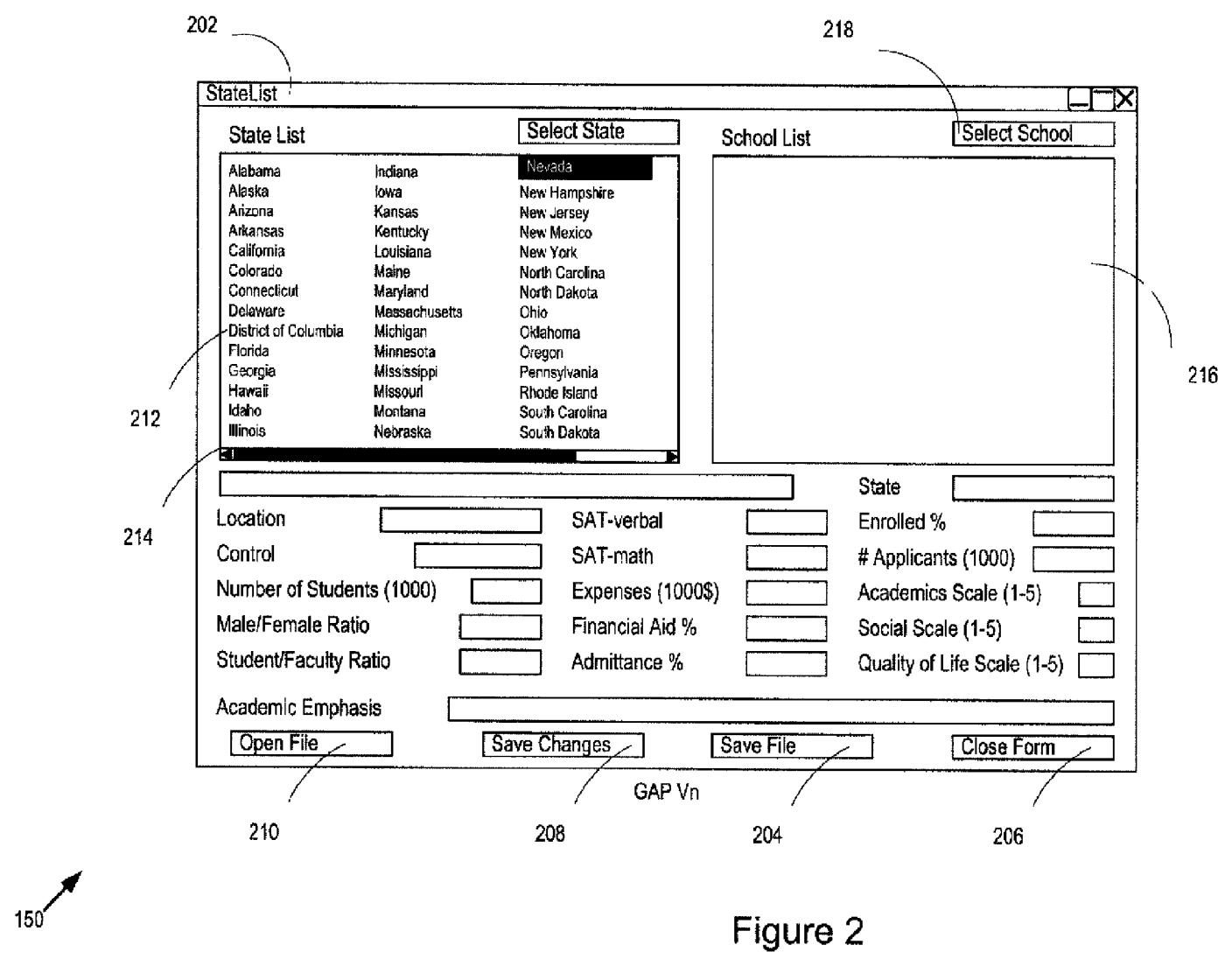

FIG. 2 shows a GUI of a current GAP version 150. Table 1 shows a current GAP tree model representation of the GUI of the current GAP version 150. The current GAP tree model shown in Table 1 specifies the GUI elements and attributes of the GUI elements of the current GAP version 150. Table 1 illustrates that the current GAP tree model supports GUI elements that include nested GUI elements. For example, StateList window 202, shown in FIG. 2, corresponds to GUI Element Alias StateList at line 11 (L11) of Table 1 and nested GUI elements SaveFile, Exit, SaveChange, FileOpen, listbox School, shown at lines 18-21 and 59 of Table 1, correspond, respectively, to Save File 204, Close Form 206, Save Change 208, Open File 210 and listbox School 216 of FIG. 2. In one implementation, the GUI difference model 162 results from a comparison of the current GAP tree model as shown in Table 1 and a subsequent GAP tree model illustrated below in Table 3.

A GAP, the GUI elements of the GAP, and the values of the GUI elements may be considered state information for the GAP. The current and subsequent GAP tree models capture the states of the current and subsequent GAP versions (e.g., 150 and 152), respectively. In one implementation, GAP states are identified by sequence numbers and alias, as well as other attributes. For example, line 1 of Table 1 illustrates a 'state' that has a SeqNumber with a value of 0. The SeqNumber represents a unique sequence number of the current GAP version. The state is given the name State_0_3556. The attributes Alias and Processid represent the alias of the current GAP version 150 and the instance process identifier for the current GAP version 150, respectively. Recall that Table 1 and Table 3 illustrate that the current and subsequent GAP tree models support GUI elements that include nested GUI elements. Although multiple GUI elements may use an identical Alias (e.g., StateList as illustrated in Table 1 at lines 2 and 11) the GUI elements are further distinguished by the UniqueID attribute (e.g., 0x0 and 0x12 as shown at lines 3 and 12 of Table 1).

TABLE 1

Current GAP tree model

```
- <State SeqNumber="0" Name="State_0_3556" Alias="University
Directory0" ProcessId="3556">
    - <GUIElement Alias="StateList">
        <UniqueID>0x0</UniqueID>
        <HWND>0x170a64</HWND>
        <Location x="87" y="66" width="792" height="672" />
        <Class>WindowsForms10.Window.8.app4</Class>
        <Style>0x16cf0000</Style>
        <ExStyle>0xc0050900</ExStyle>
    + <GUIElement Alias="System">
    + <GUIElement Alias="NAMELESS">
L11 - <GUIElement Alias="StateList">
        <UniqueID>0x12</UniqueID> fs
        <HWND>0x170a64</HWND>
        <Location x="117" y="70" width="784" height="638" />
        <Class>WindowsForms10.Window.8.app4</Class>
        <Style>0x16cf0000</Style>
        <ExStyle>0xc0050900</ExStyle>
L18 + <GUIElement Alias="SaveFile">
L19 + <GUIElement Alias="Exit">
L20 + <GUIElement Alias="SaveChange">
L21 + <GUIElement Alias="FileOpen">
    + <GUIElement Alias="Location">
    + <GUIElement Alias="AcademicEmph">
    + <GUIElement Alias="QoIScale">
    + <GUIElement Alias="SocialScale">
    + <GUIElement Alias="AcadScale">
    + <GUIElement Alias="EnrolledPerc">
    + <GUIElement Alias="AdmittancePerc">
    + <GUIElement Alias="NumApps">
    + <GUIElement Alias="FinancialAid">
    + <GUIElement Alias="Expense">
    + <GUIElement Alias="SATMath">
    + <GUIElement Alias="SATVerbal">
    + <GUIElement Alias="SFRatio">
    + <GUIElement Alias="MFRatio">
    + <GUIElement Alias="NumStudents">
    + <GUIElement Alias="Control">
    + <GUIElement Alias="State">
    + <GUIElement Alias="School">
    + <GUIElement Alias="Location">
    + <GUIElement Alias="Academic Emphasis">
    + <GUIElement Alias="Quality of Life Scale (1-5)">
    + <GUIElement Alias="Social Scale (1-5)">
    + <GUIElement Alias="Academics Scale (1-5)">
    + <GUIElement Alias="Enrolled %">
    + <GUIElement Alias="Admittance %">
```

TABLE 1-continued

Current GAP tree model

```
    + <GUIElement Alias="# Applicants (1000)">
    + <GUIElement Alias="Financial Aid %">
    + <GUIElement Alias="Expenses (1000$)">
    + <GUIElement Alias="SAT:math">
    + <GUIElement Alias="Student/Faculty Ratio">
    + <GUIElement Alias="SAT:verbal">
    + <GUIElement Alias="Male/Female Ratio">
    + <GUIElement Alias="Number of Students (1000)">
    + <GUIElement Alias="Control">
    + <GUIElement Alias="State">
    + <GUIElement Alias="SelectSchoolBtn">
    + <GUIElement Alias="School List">
L59 + <GUIElement Alias="SchoolListbox">
    + <GUIElement Alias="SelectStateBtn">
    + <GUIElement Alias="State List">
L62 + <GUIElement Alias="StateListbox">
    </GUIElement>
  </GUIElement>
</State>
```

The StateListBox GUI element shown in Table 1 at line 62 corresponds to the State listbox 212 shown in FIG. 2. FIG. 2 shows a horizontal navigation bar 214 as a feature of the State listbox 212. Table 2 shows some of the attributes of State listbox 212 that may be reflected in the GUI difference model 162 as a result of a comparison between the current GAP tree model and the subsequent GAP tree model shown in Table 3.

TABLE 2

Current GAP StateListbox GUI element schema

```
- <GUIElement Alias="StateListbox">
    <UniqueID>0x407</UniqueID>
    <HWND>0x90b58</HWND>
    <Location x="173" y="86" width="368" height="274" />
    <Class>WindowsForms10.LISTBOX.app4</Class>
    <Style>0x56110ac1</Style>
    <ExStyle>0xc0000a00</ExStyle>
  - <GUIElement Alias="StateListbox">
      <UniqueID>0x410</UniqueID>
      <HWND>0x90b58</HWND>
      <Location x="175" y="88" width="364" height="253" />
      <Class>WindowsForms10.LISTBOX.app4</Class>
      <Style>0x56110ac1</Style>
      <ExStyle>0xc0000a00</ExStyle>
    - <Values>
        <Value SeqNumber="0">Alabama</Value>
        <Value SeqNumber="1">Alaska</Value>
        <Value SeqNumber="2">Arizona</Value>
        <Value SeqNumber="3">Arkansas</Value>
        <Value SeqNumber="4">California</Value>
        <Value SeqNumber="5">Colorado</Value>
        <Value SeqNumber="6">Connecticut</Value>
        <Value SeqNumber="7">Delaware</Value>
        <Value SeqNumber="8">District of Columbia</Value>
        <Value SeqNumber="9">Florida</Value>
        <Value SeqNumber="10">Georgia</Value>
        <Value SeqNumber="11">Hawaii</Value>
        <Value SeqNumber="12">Idaho</Value>
        <Value SeqNumber="13">Illinois</Value>
        <Value SeqNumber="14">Indiana</Value>
        <Value SeqNumber="15">Iowa</Value>
        <Value SeqNumber="16">Kansas</Value>
        <Value SeqNumber="17">Kentucky</Value>
        <Value SeqNumber="18">Louisiana</Value>
        <Value SeqNumber="19">Maine</Value>
        <Value SeqNumber="20">Maryland</Value>
        <Value SeqNumber="21">Massachusetts</Value>
        <Value SeqNumber="22">Michigan</Value>
        <Value SeqNumber="23">Minnesota</Value>
        <Value SeqNumber="24">Mississippi</Value>
        <Value SeqNumber="25">Missouri</Value>
        <Value SeqNumber="26">Montana</Value>
        <Value SeqNumber="27">Nebraska</Value>
```

TABLE 2-continued

Current GAP StateListbox GUI element schema

```
        <Value SeqNumber="28">Nevada</Value>
        <Value SeqNumber="29">New Hampshire</Value>
        <Value SeqNumber="30">New Jersey</Value>
        <Value SeqNumber="31">New Mexico</Value>
        <Value SeqNumber="32">New York</Value>
        <Value SeqNumber="33">North Carolina</Value>
        <Value SeqNumber="34">North Dakota</Value>
        <Value SeqNumber="35">Ohio</Value>
        <Value SeqNumber="36">Oklahoma</Value>
        <Value SeqNumber="37">Oregon</Value>
        <Value SeqNumber="38">Pennsylvania</Value>
        <Value SeqNumber="39">Rhode Island</Value>
        <Value SeqNumber="40">South Carolina</Value>
        <Value SeqNumber="41">South Dakota</Value>
        <Value SeqNumber="42">Tennessee</Value>
        <Value SeqNumber="43">Texas</Value>
        <Value SeqNumber="44">Utah</Value>
        <Value SeqNumber="45">Vermont</Value>
        <Value SeqNumber="46">Virginia</Value>
        <Value SeqNumber="47">Washington</Value>
        <Value SeqNumber="48">West Virginia</Value>
        <Value SeqNumber="49">Wisconsin</Value>
        <Value SeqNumber="50">Wyoming</Value>
      </Values>
    </GUIElement>
  + <GUIElement Alias="Horizontal">
</GUIElement>
```

TABLE 3

Subsequent GAP tree model

```
- <State SeqNumber="0" Name="State_0_3068" Alias="University
  Directory1" ProcessId="3068">
  - <GUIElement Alias="School">
      <UniqueID>0x0</UniqueID>
      <HWND>0x80b8</HWND>
      <Location x="116" y="88" width="915" height="594" />
      <Class>WindowsForms10.Window.8.app.0.378734a</Class>
      <Style>0x16cf0000</Style>
      <ExStyle>0xc0050900</ExStyle>
    + <GUIElement Alias="System">
    + <GUIElement Alias="NAMELESS">
L11 - <GUIElement Alias="School">
      <UniqueID>0x12</UniqueID>
      <HWND>0x80b8</HWND>
      <Location x="146" y="92" width="907" height="560" />
      <Class>WindowsForms10.Window.8.app.0.378734a</Class>
      <Style>0x16cf0000</Style>
      <ExStyle>0xc0050900</ExStyle>
L18 + <GUIElement Alias="menuStrip1">
    + <GUIElement Alias="States List">
    + <GUIElement Alias="School List">
    + <GUIElement Alias="SelectStatelButton">
    + <GUIElement Alias="SelectSchoolButton">
L23 + <GUIElement Alias="StateListbox">
L24 + <GUIElement Alias="SchoolCombobox">
    + <GUIElement Alias="School">
    + <GUIElement Alias="state">
    + <GUIElement Alias="State">
    + <GUIElement Alias="location">
    + <GUIElement Alias="Location">
    + <GUIElement Alias="control">
    + <GUIElement Alias="Control">
    + <GUIElement Alias="Number of Students (1000)">
    + <GUIElement Alias="NumStudents">
    + <GUIElement Alias="Male/Female Ratio">
    + <GUIElement Alias="GenderRatio">
    + <GUIElement Alias="Student/Faculty Ratio">
    + <GUIElement Alias="SFRatio">
    + <GUIElement Alias="SAT Verbal">
    + <GUIElement Alias="SATVerbal">
    + <GUIElement Alias="SAT Math">
    + <GUIElement Alias="SATMath">
    + <GUIElement Alias="Number of Applicants">
    + <GUIElement Alias="NumApps">
    + <GUIElement Alias="Percent of Admittance">
    + <GUIElement Alias="PercAdmit">
    + <GUIElement Alias="Percent Enrolled">
    + <GUIElement Alias="Percent Enrolled">
    + <GUIElement Alias="Academics (1-5)">
    + <GUIElement Alias="Academics">
    + <GUIElement Alias="Social (1-5)">
    + <GUIElement Alias="Social">
    + <GUIElement Alias="Quality of Life (1-5)">
    + <GUIElement Alias="QoLife">
    + <GUIElement Alias="Academic Emphasis">
    + <GUIElement Alias="AcadEmphasis">
    + <GUIElement Alias="Expenses">
    + <GUIElement Alias="Expense">
    + <GUIElement Alias="Financial Aid">
    + <GUIElement Alias="FinancialAid">
    </GUIElement>
  </GUIElement>
</State>
```

Figure 3:
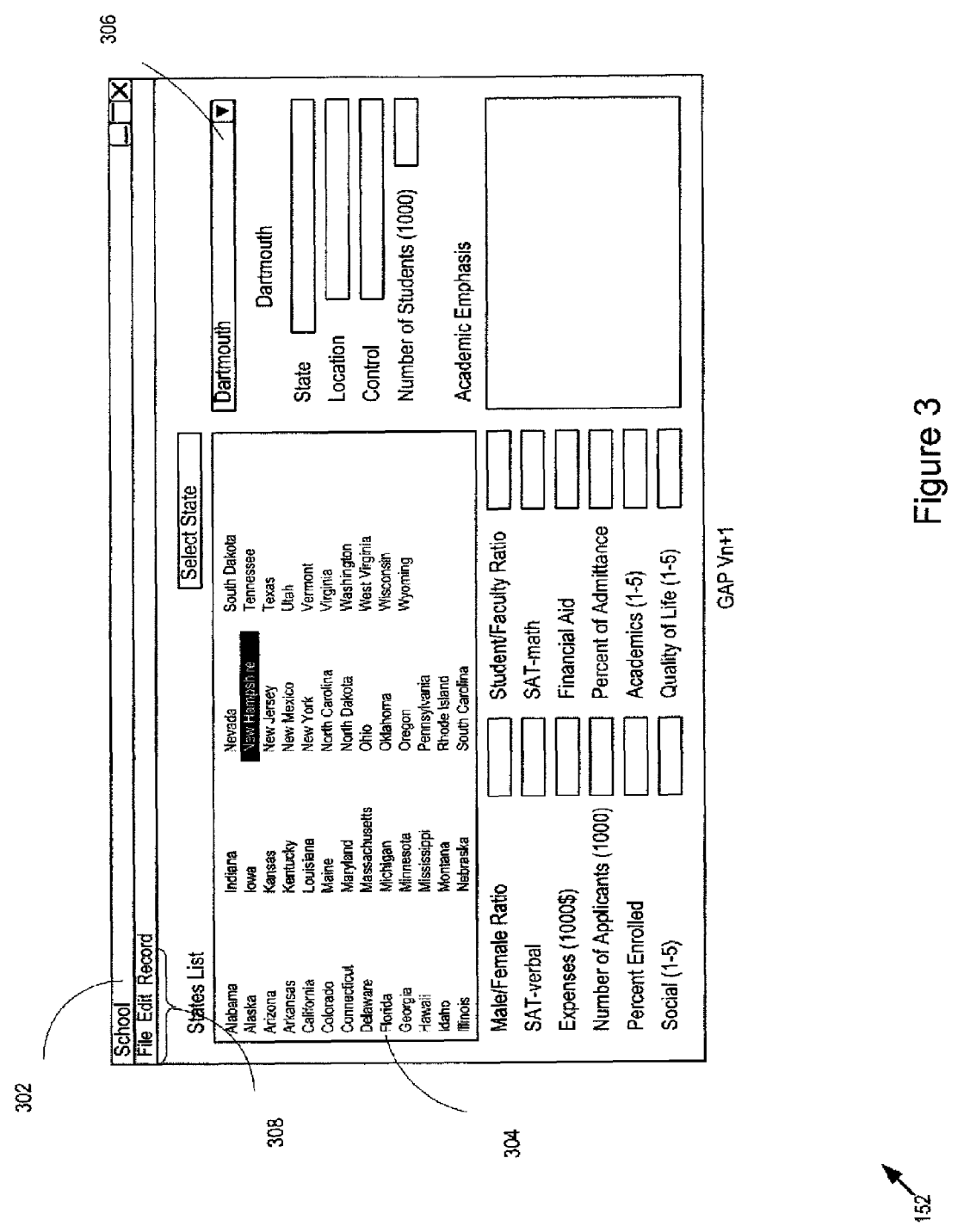

FIG. 3 shows a GUI of a subsequent GAP version 152. Table 3 illustrates a subsequent GAP tree model representation of the subsequent GAP version 152. The subsequent GAP tree model shown in Table 3 includes the GUI elements and the attributes of the GUI elements. For example, the window GUI object School 302 shown in FIG. 3 corresponds to GUI Element Alias "School" shown at line 11 (L11) of Table 3 and nested GUI elements StateListBox and School-Combobox shown at lines 23 and 24 of Table 3 correspond, respectively, to State listbox 304 and School combobox 306 of FIG. 3.

In one implementation, the GUI difference model 162 results from a comparison between the current GAP tree model as shown in Table 1 and a subsequent GAP tree model as shown in Table 3. In another implementation, the economic cost engine 182 analyzes the current GAP tree model using GAP change specifiers 184 to determine GAP changes that may produce the subsequent GAP tree model, from which the economic cost engine 182 generates synthetic GAP change specifiers 185. For example, prior to actually building the subsequent GAP version 152, a programmer may identify various proposed changes to a current GAP version 150 using the GAP change specifiers 184. The economic cost engine 182 analyzes the GAP change specifiers 184 and current GAP tree model to generate synthetic GAP change specifiers 185 that correspond to a proposed subsequent GAP tree model. In one implementation, the economic cost engine 182 includes GAP change specifier logic that generates synthetic GAP change specifiers 185 using the current GAP tree model and the received GAP change specifiers 184. In one implementation, the economic cost engine architecture 110 generates the synthetic GAP change specifiers 185 as a result of recording various proposed changes identified by the programmer during an interactive session with the current GAP version 150.

The subsequent GAP menuStrip1 GUI element schema shown in Table 3 at line 18 corresponds to the WinObject GUI object 'menu strip' 308 shown in FIG. 3. The subsequent GAP menuStrip1 GUI element schema shown in Table 4 illustrates the full entry at line 18 in Table 3 and indicates that the menu strip 308 includes a nested GUI element Filemenu that includes nest GUI elements OpenFile, SaveFile, SaveAs, and Exit, shown at lines 15 of Table 4, and 22-25, respectively.

TABLE 4

Subsequent GAP menuStrip1 GUI element schema

```
- <GUIElement Alias="menuStrip1">
    <UniqueID>0x13</UniqueID>
    <HWND>0xa0e62</HWND>
    <Location x="146" y="92" width="907" height="24" />
    <Class>WindowsForms10.Window.8.app.0.378734a</Class>
    <Style>0x56000000</Style>
    <ExStyle>0xc0010800</ExStyle>
  - <GUIElement Alias="menuStrip1">
      <UniqueID>0x1c</UniqueID>
      <HWND>0xa0e62</HWND>
      <Location x="146" y="92" width="907" height="24" />
      <Class>WindowsForms10.Window.8.app.0.378734a</Class>
      <Style>0x56000000</Style>
      <ExStyle>0xc0010800</ExStyle>
L15 - <GUIElement Alias="FileMenu">
        <UniqueID>0x1d</UniqueID>
        <HWND>0xa0e62</HWND>
        <Location x="148" y="98" width="35" height="20" />
        <Class>WindowsForms10.Window.8.app.0.378734a</Class>
        <Style>0x56000000</Style>
        <ExStyle>0xc0010800</ExStyle>
L22     + <GUIElement Alias="OpenFile">
L23     + <GUIElement Alias="SaveFile">
L24     + <GUIElement Alias="SaveAsFile">
L25     + <GUIElement Alias="Exit">
      </GUIElement>
   </GUIElement>
</GUIElement>
```

Figure 4:
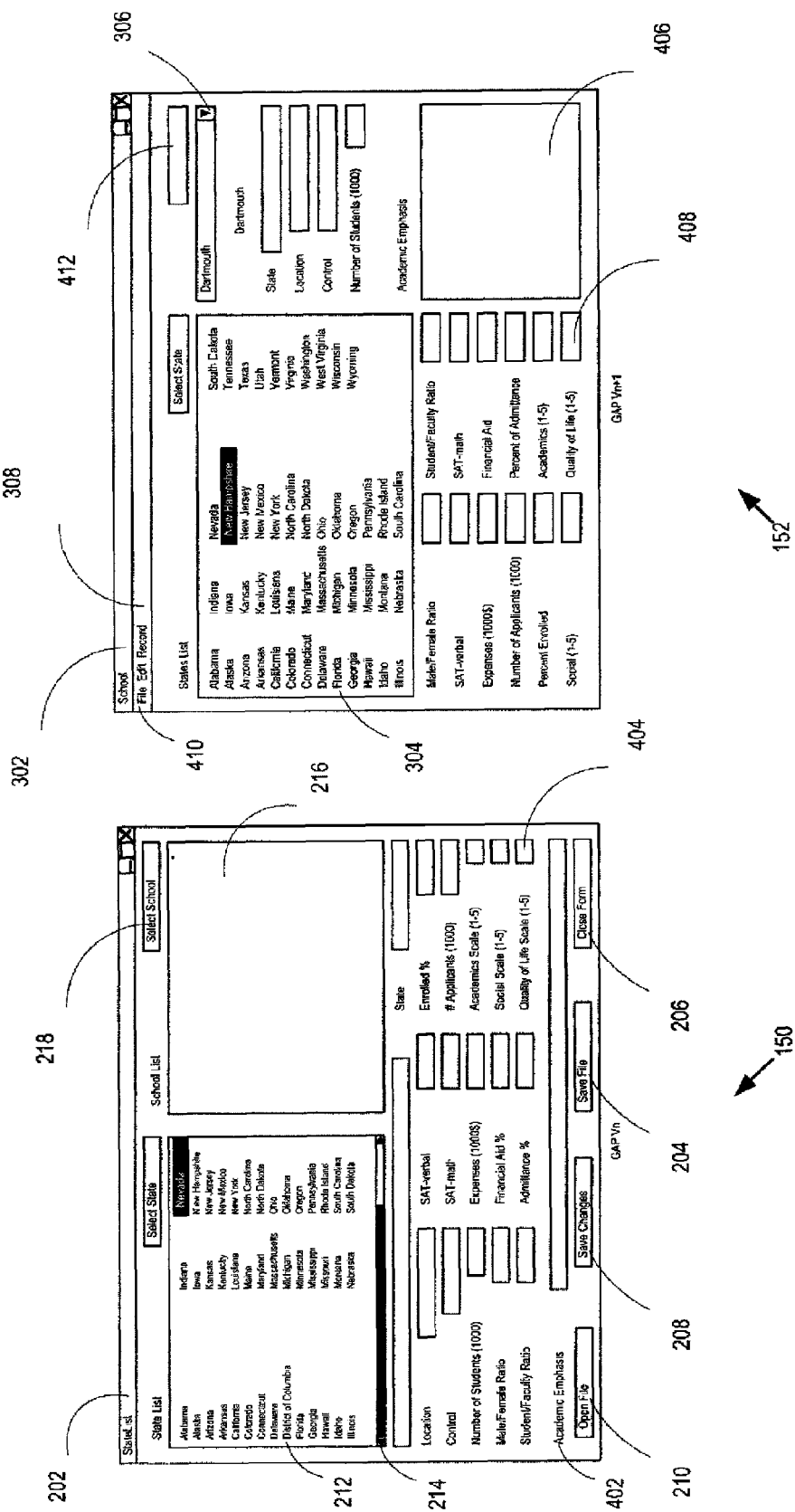
FIG. 4 illustrates a current and a subsequent GAP GUI comparison.

FIG. 4 illustrates a side by side view 400 of the current and subsequent GAP that helps illustrate GUI element similarities, as well as differences, between successive GAP versions. In the view 400, there are several GUI objects that have the same desired functionality between successive GAP versions, although aspects of the GUI object may appear different between successive GAP versions.

For example, referring to FIG. 4, differences between the current GAP version 150 and subsequent GAP version 152 include the window StateList 202, listbox State 212, field Academic Emphasis 402, and field Quality of Life Scale (1-5) 404 in the current GAP version 150 are respectively represented by window School 302, listbox State 304, field Academic Emphasis 406, and field Quality of Life (1-5) 408 in the subsequent GAP version 152. In another example, consider the Save File 204, Close Form 206, Save Change 208 and Open File 210 GUI objects implemented in the current GAP version 150 that have been implemented in the subsequent GAP version 152 as child GUI objects of the File 410, which is a child GUI object of the menu strip 308 GUI object.

It can be challenging to locate differences between GUI elements of GAPs. For example, it is not readily evident that the listbox School 216 and the combobox School 306 are meant to have the same or similar functionality between successive GAP versions. As another example, the WinObject "Select School" 218 in the current GAP version 150 has been removed at location 412 from the subsequent GAP version 152. The GUI difference model 162 includes GUI element difference entries that list characteristics of GUI elements, for those GUI elements that match between the current GAP version 150 and the subsequent GAP version 152, but that differ in character between the current GAP version 150 and the subsequent GAP version 152. The GUI element difference entries facilitate the economic cost engine 182 analysis to obtain GUI transformation costs and generate test script transformation cost reports, as described in more detail below.

Figure 5:
FIG. 5 shows an exemplary GUI element difference entry.

FIG. 5 shows an exemplary GUI element difference entry 504. FIG. 5 illustrates a GUI difference model 162 obtained by comparing a current GAP tree model as shown in Table 1 and a subsequent GAP tree model as shown in Table 3. In one implementation, the GUI difference model 162 is implemented as an XML schema that specifies each GUI element difference between successive GAP versions with a corresponding GUI element difference entry. In another implementation, the GUI difference model 162 nests GUI element difference entries to indicate parent and child GUI elements, and the level at which a GUI element difference entry is nested indicates how far the corresponding GUI element is away from a parent GUI element (root) in a navigation path.

In one implementation, the GUI difference model 162 omits a GUI element difference entry for GUI objects that have been deleted between successive GAP versions. Each GUI element difference entry representing a GUI object that has been modified or added between successive GAP versions includes a tag 'Version' that has a value of, as examples, either 0 or 1. In other words, a GUI element difference entry that does not include a Version tag indicates that the GUI object has not been modified between successive GAP versions. The Version values of 0 and 1 indicate whether the children elements of the Version represent the properties of the GUI object in the current GAP version 150 or the subsequent GAP version 152, respectively. For example, the GUI difference entry 504 shown in FIG. 5 indicates at line 10 that the listbox StateListbox value for SeqNumber="8" implemented in the current GAP version 150 is "District of Columbia", while the value in the subsequent GAP version 152 is "Florida" as indicated at line 21. In one implementation, the GUI difference entry 504 includes a ParentChildIdentifier element, shown in lines 2 and 15 of FIG. 5, that identifies the relationship between two GUI objects in a given GAP GUI version, so that GUI class and inheritance constraints can be validated (discussed in detail further below).

Referring briefly to FIG. 14, the GUI difference entry 1404 indicates at line 1 that the window StateList in the current GAP version 150 corresponds to the window School in the subsequent GAP version 152 indicated at line 22 by the Version value equal to 0 and 1, respectively. The StateList and School GUI objects are of the WindowsForm10.Window.8 class, as shown at lines 8 and 28. The sub-class identifier for the StateList and School GUI object distinguish the GUI objects (e.g., app4 and app.0.0378734a, respectively). The GUI difference entry 1404 indicates that the Location element of the StateList and School windows are different, as shown at lines 7 and 27, respectively. However, the GUI difference entry 1404 also indicates that the Style and ExStyle elements are identical, as shown at lines 9-10 and 29-30, respectively.

Referring briefly to FIG. 15, the GUI difference entry 1504 indicates at line 3 that the listbox SchoolListbox in the current GAP version 150 corresponds to the combobox SchoolCombobox in the subsequent GAP version 152 indicated at line 13. The GUI difference entry 1504 indicates that the Location element of the SchoolListbox and SchoolCombobox are different, as shown at lines 7 and 18, respectively. The GUI difference entry 1504 also indicates that the Class, Style and ExStyle elements are different, as shown at lines 8-10 and 19-21, respectively. In particular, one or more of the properties of a WindowsForms10.LISTBOX and a WindowsForms10.COMBOBOX are different, incompatible with the properties of the other class, and child GUI elements of GUI objects of these two classes may have one or more incompatible properties.

FIG. 6 shows a current test script 164 for the current GAP GUI. The current test script 164 includes navigation statements (e.g., L1 and L6) that navigate to GUI objects, perform read, write, or other actions (functions) on GUI objects, and the arguments of these functions. For example, line 1 of the current test script 164 navigates to a window StateList, locates 'Open File' identified as a child GUI object of the window StateList, and performs an action 'Click' on the 'Open File' GUI object at XY coordinates 86, 12. Through the series of navigation and action statements, the current test script 164 opens a file 'university.data' as indicated by lines 2-3. A 'State' is selected from the StateListbox and a SchoolListbox is activated, based on lines 4-6. The current test script 164 successively selects from the SchoolListbox the schools 'Acme University' and 'State University' located in the 'State' by using a 'For Next Loop', as a result of the navigation and action statements at lines 7-17 based on the coordinates 67, School_Constant in WinObject "Select School" at line 8. The current test script 164 uses conditional branching at lines 11-15 to change the academic scale to '3' for 'Acme University' and to '2' for 'State University', and saves the individual changes as a result of line 16. The current test script 164 saves all the changes to a new file 'university_revise.data' as a result of the statements at lines 18-20.

Figure 7:
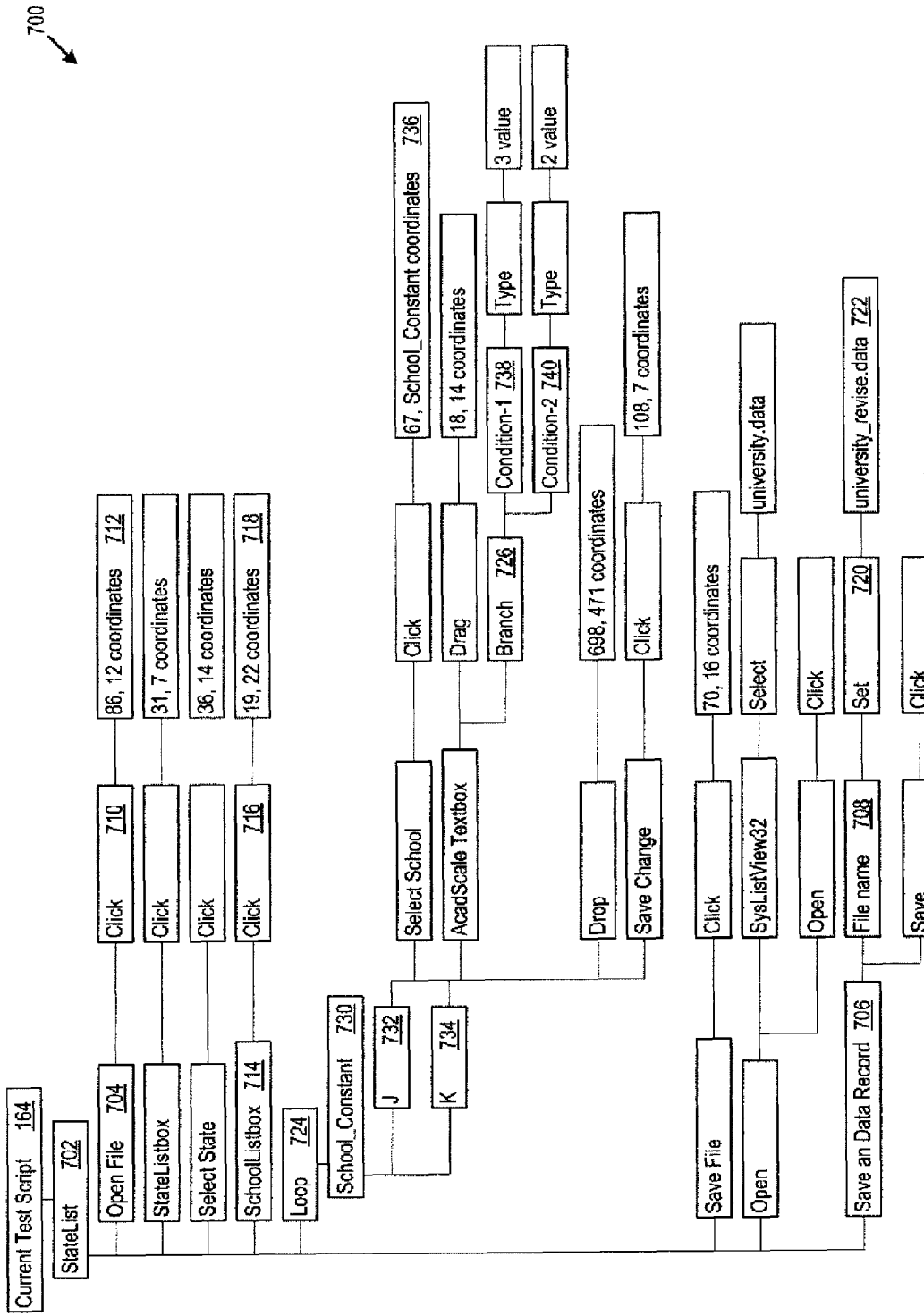
FIG. 7 shows a current test script representation.

FIG. 7 illustrates a current test script representation 700 that the script parser 166 produces as an intermediate representation of the current test script 164. In one implementation, the economic cost engine architecture 110 implements the current test script representation as an abstract syntax tree (AST) 168. The current test script representation 700 represents a vector (e.g., the current test script 164) whose elements are vectors that represent navigation statements of the current test script 164. In other words, the current test script representation 700 represents the navigation statements as test script statement vectors that navigate to GUI objects and perform actions on those GUI objects. Table 5 illustrates a grammar the script parser 166 may use to produce the current test script representation 700. The terminals func, action and var represent the names of platform-specific functions that navigate to GUI objects (e.g., Window, VbEdit, and WinObject), perform read, write, or other actions (functions) on GUI objects, and the arguments of these functions, respectively.

TABLE 5

Script Parser Grammar navstmt ::= func(arg) | navstmt . Navstmt | navstmt action arg
fullnavstmt ::= var = navstmt | navstmt action arg
arg ::= expr | "," arg |

The script parser 166 represents the test script statement vectors as an ordered sequence of nodes that contain function names and the arguments of those functions that navigate to GUI objects. The nodes of a test script statement vector include a source node and a destination. For example, the script parser 166 may represent the test script statement vector corresponding to line 1 of the current test script 164 as source node StateList 702 and a destination node 'Open File' 704. The nodes of a test script statement vector may also include intermediate nodes positioned between a source node and a destination node. For example, the script parser 166 may represent the test script statement vector corresponding to line 19 of the current test script 164 as source node StateList 702, intermediate node 'Save a Data Record' 706 and destination node 'File name' 708. The test script statement vector corresponding to line 19 of the current test script 164 may be further expressed as (702-706-708-720-722), including the method 'Set' 720 and value 'university revise.data' 722.

The test script statement vectors may include looping and conditional branching nodes (e.g., loop 724 and branch 726, respectively). In one implementation, the loop 724 node is followed by a loop variable (e.g., school_constant 730) for which a range of values, from a lower to an upper bound (e.g., J 732 and K 734), are evaluated and used in expressions within the scope of the loop 724 (e.g., 67, school_constant coordinates 736). The branch 726 may be followed by one or more conditions (e.g., condition-1 738 and condition-2 740). The economic cost engine 182 may use the loop 724 and branch 726 nodes, and range values and conditions (e.g., J 732, K 734, condition-1 738 and condition-2 740) to recursively evaluate the current test script representation 700.

In one implementation, the GAP change specifiers 184 includes a model specifier (discussed in further detail below) that identifies the GUI element change cost rule to use to obtain a GUI transformation cost corresponding to a loop 724. The GUI element change cost rule for a loop 724 may result in the economic cost model logic 196 obtaining a GUI transformation cost that represents a multiplier equal to the number of values in the range from a lower to an upper bound (e.g., J 732 and K 734) that is applied to the GUI transformation costs for the test script statements within the scope of the loop 724 (e.g., lines 8-16 in FIG. 6). For example, the GUI transformation cost corresponding to loop 724, based on the lower to the upper bound (e.g., J 732 and K 734), may equal 10 and the GUI transformation costs corresponding to the test script statements within the scope of the loop 724 (e.g., lines 8-16 in FIG. 6) may equal 500, resulting in a total GUI transformation cost of 5,000 for the test script statements including loop 724 (e.g., lines 7-17). In another example, the GUI transformation cost obtained by applying the GUI element change cost rule for a loop 724 may represent a single weighted valued (e.g., 50) that the economic cost model logic 196 adds to the GUI transformation costs corresponding to the test script statements within the scope of loop 724 so that the total GUI transformation cost of 550 results for the test script statements including loop 724 (e.g., lines 7-17).

The GUI element change cost rule for a branch 726 may result in obtaining a GUI transformation cost that is based on the number of conditions (e.g., condition-1 738 and condition-2 740) within the scope of the branch 726, and the GUI transformation costs for the branch 726 and the test script statements within the scope of the branch 726 are added to obtain the total GUI transformation costs. In another implementation, the GUI transformation cost corresponding to the branch 726 is a multiplier that is applied to the GUI transformation costs corresponding to the test script statements within the scope of the branch 726. For example, two conditions (e.g., condition-1 738 and condition-2 740) exist within the scope of the branch 726, corresponding to a GUI transformation costs of 2 for the branch 726 and the GUI transformation costs of the lines within the scope of the branch 726 are 100 resulting in a total GUI transformation cost of 200 for the test script statements including branch 726 (e.g., lines 11-15).

The script parser 166 evaluates arguments of navigation and action functions as expressions, variables and constants. The arguments express the physical properties of GUI objects to which the test script statement vectors navigate and values used to perform actions on those GUI objects. For example, the '86,12' coordinates 712 identify the location for a pointing device to perform an action 'Click' 710 on the 'Open File' 704 GUI object, which is a child GUI Object of the window StateList 702. The economic cost engine 182 uses the names of the GUI objects (e.g., StateList 702 and 'Open File' 704) navigated to by the test script statement vectors to locate the corresponding physical properties of the GUI objects stored in an object repository 174, identify corresponding GUI difference entries and generate synthetic GAP change specifiers 185.

In one implementation, the economic cost engine 182 uses the OR lookup logic 172 to locate, in the object repository 174, the physical properties of the GUI objects navigated to by a test script statement vector, and locate, in the GUI difference model 162, corresponding GUI difference entries. The economic cost engine 182 generates synthetic GAP change specifiers 185 and invokes the economic cost model logic 196 to locate corresponding GUI element change cost rules in the economic models 176 repository using GAP change specifiers 184 and synthetic GAP change specifiers 185. In one implementation, the OR lookup logic 172 is divided into two sub-functions: 1) lookup logic adapted to locate and retrieve the physical properties of the GUI objects navigated to by the test script statement vector (e.g., 702-704, 702-706-708, and 702-714); and 2) locator logic that finds and returns a GUI element difference entry (node) in the GUI difference model 162 that corresponds to the GUI object with the given physical properties. The economic cost model logic 196 generates synthetic GAP change specifiers 185 that are used to locate applicable GUI element change cost rules, based on the lookup logic and locator logic results from the OR lookup logic 172. The OR lookup logic 172 may include path traversal logic, discussed in further detail below, to identify possible navigation paths of a test script statement vector between a source node GUI object and destination node GUI object to which a test script statement vector navigates.

Table 6 illustrates one implementation of an object repository 174, in the form of an XML schema. The object repository 174 includes a GUI object entry for each GUI object of the current GAP version 150 identified in the current test script 164. The object repository 174 may be generated by a script writing tool, such as Quick Test Pro (QTP), Rational Robot, and Compuware Test Partner. The economic cost engine 182 may query the object repository 174 to identify the physical properties of the GUI objects navigated to by the test script statement vectors represented by the current test script representation 700. Physical properties of a GUI object may indicate whether the GUI object is hidden, read-only, a number and default values, as shown in Table 7.

For example, the economic cost engine 182 analyzes the GUI objects 702-714 in the test script statement vector. The '19,22' coordinate 718 identifies the location for a pointing device to perform an action 'Click' 716 on the GUI object SchooListbox 714, which is a child GUI Object of the window StateList 702. The economic cost engine 182 invokes the OR lookup logic 172 to locate the physical properties of the GUI objects 702 and 714. The OR lookup logic 172 locates the physical properties of the window StateList 702 and the WinObject SchoolListbox 714, as shown in Table 6 at lines 3 and 12. The economic cost engine 182 uses the physical properties retrieved from the object repository 174 to locate corresponding GUI difference entries (e.g., 1404 and 1504) in the GUI difference model 162. The GUI difference entries 1404 and 1504 indicate that the window StateList 702 and the WinObject SchoolListbox 714 in the current GAP version 150 correspond to the window School 302 and the WinObject SchoolCombobox 306 in the subsequent GAP version 152, respectively. In one implementation, the economic cost engine 182 employs the OR lookup logic 172 to traverse the GUI difference model 162 using the physical properties of the GUI objects navigated to by the test script statement vector. The OR lookup logic 172 function returns a GUI element difference entry (e.g., 504, 1404 and 1504) from the GUI difference model 162 that represents the GUI object navigated to by the test script statement vector (e.g., 702-704-710-712, 702-706-708-720-722, and 702-714-726-718), and the economic cost model logic 196 generates corresponding synthetic GAP change specifiers 185.

TABLE 6

Object Repository

- <XYZRep:ObjectRepository
   xmlns:XYZRep="http://www.vendorXYZ.com/XYZ/ObjectRepository">
- <XYZRep:Objects>
L3 - <XYZRep:Object Class="Window" Name="StateList">
  + <XYZRep:Properties>
  + <XYZRep:BasicIdentification>
  + <XYZRep:CustomReplay>
L7 - <XYZRep:ChildObjects>
     + <XYZRep:Object Class="WinObject" Name="Open File">
     + <XYZRep:Object Class="WinObject" Name="StateListbox">
     + <XYZRep:Object Class="WinObject" Name="Select State">
     + <XYZRep:Object Class="WinObject" Name="Select School">
     + <XYZRep:Object Class="WinObject" Name="SchoolListbox">
    </XYZRep:ChildObjects>
  </XYZRep:Object>
 </XYZRep:Objects>
 <XYZRep:Parameters />
 <XYZRep:Metadata />
</XYZRep:ObjectRepository>

Table 7 illustrates the physical properties that may be located in the object repository for the GUI object entry corresponding to the SchoolListbox 714.

TABLE 7

GUI object entry WinObject ("SchoolListbox")

- <XYZRep:Object Class="WinObject" Name="SchoolListbox">
L2 - <XYZRep:Properties>
   - <XYZRep:Property Name="y" Hidden="0" ReadOnly="0" Type="NUMBER">
     <XYZRep:Value RegularExpression="0">86</XYZRep:Value>
     </XYZRep:Property>
   - <XYZRep:Property Name="x" Hidden="0" ReadOnly="0" Type="NUMBER">
     <XYZRep:Value RegularExpression="0">420</XYZRep:Value>
     </XYZRep:Property>
   - <XYZRep:Property Name="windowstyle" Hidden="0" ReadOnly="0" Type="NUMBER">
     <XYZRep:Value RegularExpression="0">1442906305</XYZRep:Value>
     </XYZRep:Property>
   - <XYZRep:Property Name="windowextendedstyle" Hidden="0" ReadOnly="0" Type="NUMBER">
     <XYZRep:Value RegularExpression="0">512</XYZRep:Value>
     </XYZRep:Property>
   - <XYZRep:Property Name="window id" Hidden="0" ReadOnly="0" Type="NUMBER">
     <XYZRep:Value RegularExpression="0">1182924</XYZRep:Value>
     </XYZRep:Property>

TABLE 7-continued

GUI object entry WinObject ("SchoolListbox")

```
      - <XYZRep:Property Name="width" Hidden="0" ReadOnly="0" Type="NUMBER">
        <XYZRep:Value RegularExpression="0">336</XYZRep:Value>
        </XYZRep:Property>
      - <XYZRep:Property Name="visible" Hidden="0" ReadOnly="0" Type="BOOL">
        <XYZRep:Value RegularExpression="0">-1</XYZRep:Value>
        </XYZRep:Property>
      - <XYZRep:Property Name="regexpwndclass" Hidden="0" ReadOnly="0" Type="STRING">
        <XYZRep:Value RegularExpression="0">WindowsForms10.LISTBOX.app4</XYZRep:Value>
        </XYZRep:Property>
      - <XYZRep:Property Name="object class" Hidden="0" ReadOnly="0" Type="STRING">
        <XYZRep:Value RegularExpression="0">WindowsForms10.LISTBOX.app4</XYZRep:Value>
        </XYZRep:Property>
      - <XYZRep:Property Name="nativeclass" Hidden="0" ReadOnly="0" Type="STRING">
        <XYZRep:Value RegularExpression="0">WindowsForms10.LISTBOX.app4</XYZRep:Value>
        </XYZRep:Property>
      - <XYZRep:Property Name="height" Hidden="0" ReadOnly="0" Type="NUMBER">
        <XYZRep:Value RegularExpression="0">260</XYZRep:Value>
        </XYZRep:Property>
      - <XYZRep:Property Name="enabled" Hidden="0" ReadOnly="0" Type="BOOL">
        <XYZRep:Value RegularExpression="0">-1</XYZRep:Value>
        </XYZRep:Property>
L39     </XYZRep:Properties>
      - <XYZRep:BasicIdentification>
        <XYZRep:PropertyRef>y</XYZRep:PropertyRef>
        <XYZRep:PropertyRef>x</XYZRep:PropertyRef>
        <XYZRep:PropertyRef>windowstyle</XYZRep:PropertyRef>
        <XYZRep:PropertyRef>windowextendedstyle</XYZRep:PropertyRef>
        <XYZRep:PropertyRef>width</XYZRep:PropertyRef>
        <XYZRep:PropertyRef>visible</XYZRep:PropertyRef>
        <XYZRep:PropertyRef>regexpwndclass</XYZRep:PropertyRef>
        <XYZRep:PropertyRef>object class</XYZRep:PropertyRef>
        <XYZRep:PropertyRef>nativeclass</XYZRep:PropertyRef>
        <XYZRep:PropertyRef>height</XYZRep:PropertyRef>
        <XYZRep:PropertyRef>enabled</XYZRep:PropertyRef>
        </XYZRep:BasicIdentification>
      - <XYZRep:CustomReplay>
        <XYZRep:Behavior Name="simclass"
                Type="STRING">WindowsForms10.LISTBOX.app4</XYZRep:Behavior>
        </XYZRep:CustomReplay>
      - <XYZRep:Comments>
        <XYZRep:Comment Name="miccommentproperty" />
        </XYZRep:Comments>
        <XYZRep:ChildObjects />
      </XYZRep:Object>
```

Figure 8:
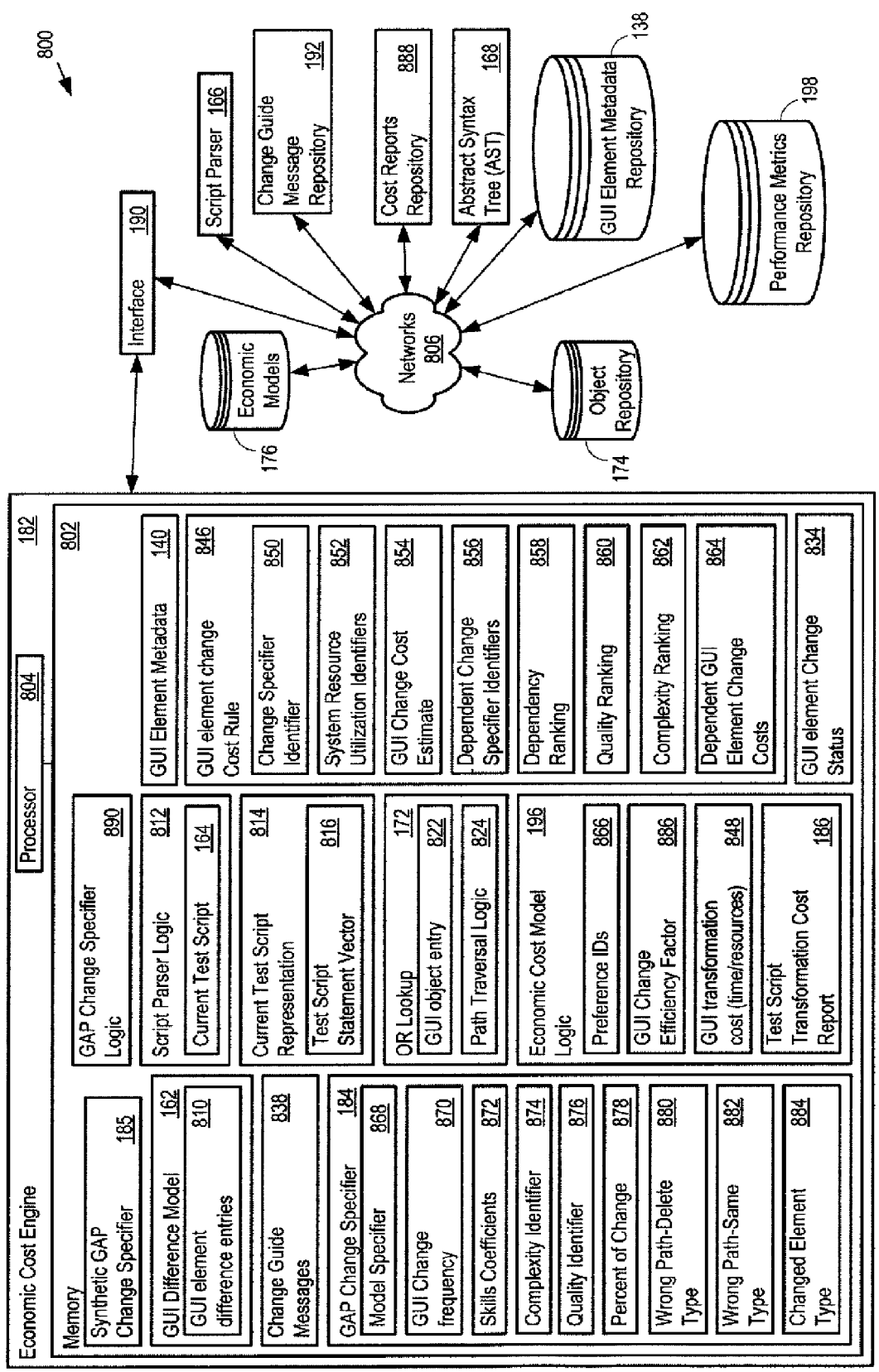
FIG. 8 shows an example economic cost engine system.

FIG. 8 shows an example economic cost engine system 800 that may implement the economic cost engine 182. The economic cost engine 182 includes a memory 802 coupled to a processor 804, and an interface 190. In one implementation, the interface 190 communicates with the GUI element metadata repository 138 and the GUI difference model 162 to receive GUI element metadata 140 and GUI difference entries 810, respectively. The interface 190 is connected to a network 806 (e.g., the Internet) in communication with various other systems and resources. In another implementation, the memory 802 includes the GUI element metadata 140, and GAP change specifier logic 890 that produces the GUI difference model 162 and the GUI element difference entries 810. The memory 802 also includes script parser logic 812 that receives the current test script 164 and produces the AST 168, processes the AST 168 as a current test script representation 814, and produces the test script statement vectors 816 (e.g., 702-704-710-712, 702-706-708-720-722, and 702-714-726-718).

The memory 802 further includes economic cost model logic 196 that, in one implementation, invokes the OR lookup logic 172 to locate, in the object repository 174, a GUI object entry 822 referred to by the test script statement vector 816. In another implementation, the economic cost engine 182 invokes the OR lookup logic 172 to locate, in various external sources, a GUI object entry 822 matching the test script statement vector 816. When the test script statement vector 816 (e.g., 702-704-710-712, 702-706-708-720-722, and 702-714-726-718) employs constants to identify GUI object names, rather than expressions whose values can only be determined at runtime, the OR lookup logic 172 function may use the GUI object name and properties of the GUI object to efficiently locate the correct GUI object entry 822 and locate, in the GUI difference model 162, a GUI element difference entry 810 matching the GUI object entry 822.

For example, the test script statement vector represented by 702-704-710-712 identifies the window GUI object StateList 202 and the listbox GUI object SchoolListbox 216, shown in the current test script 164 navigation statement shown at line 6 of FIG. 6:

Window("StateList").WinObject("SchoolListbox").Click 19,22.

The OR lookup logic 172 locates each GUI object entry 822 for GUI objects 202 and 216, using the known names of the GUI objects, StateList and SchoolListbox, respectively. The OR lookup logic 172 locates the corresponding GUI element difference entries 1404 and 1504, in the GUI difference model 162. In one implementation, the economic cost model logic 196 analyzes the GUI element difference entries 1404 and 1504 and generates one or more corresponding synthetic GAP change specifiers 185. Using the GAP change specifiers 184, the economic cost model logic 196 locates, in the economic models 176 repository, one or more corresponding GUI element change cost rules 846 and applies the cost rules to obtain GUI transformation costs 848. The GUI transformation costs 848 may include costs corresponding to changing the current test script 164 and testing the subsequent GAP version 152. In other words, the economic cost model logic 196 determines the costs to generate a transformed test script statement that corresponds to GUI objects School 302 and SchoolCombobox 306 and the costs to test the subsequent GAP version 152 using the transformed test script statement:

Window("School").WinObject("SchoolCombobox").Click 294,14.

Each GUI element change cost rule 846 may include various attributes, including: a change specifier identifier 850, system resource utilization identifiers 852, a GUI change cost estimate 854 that indicates the estimated time and/or resources needed to test a corresponding GUI element change, dependent change specifier identifiers 856, dependency ranking 858, quality ranking 860, complexity ranking 862, and dependent GUI element change costs 864. Each economic model, residing in the economic models 176 repository and/or external to the economic models 176 repository that is available to the economic cost model logic 196 through the interface 190, may include more, fewer, or different GUI element change cost rule 846 attributes.

The economic cost model logic 196 uses GAP change specifiers 184 and synthetic GAP change specifiers 185 to locate applicable GUI element change cost rules 846, in the economic models 176 repository, corresponding to change specifier identifiers 850. The system resource utilization identifiers 852 indicate the resources used to test a particular GUI element change. In one implementation, the system resource utilization identifiers 852 have values from 1 to 10 that identify the amount of a test environment's processing and infrastructure capacity needed to test a corresponding GAP change. For example, a system resource utilization identifier 852 with a value of 3, corresponding to the test environment's processing capacity, may indicate that one-third of the available processing capacity is needed to test a corresponding GAP change. A system resource utilization identifier 852 with a value of 10, corresponding to the test environment's processing capacity, may indicate that most of the available computing resources (e.g., processing capacity) will be needed to test a corresponding GAP change.

In another implementation, the system resource utilization identifiers 852 provide descriptions of the resources needed to test a corresponding GAP change. For example, the system resource utilization identifiers 852 may itemize the skills of testers, system components (e.g., input and output devices, and network bandwidth) and the priority settings to be assigned to system processes used to test a corresponding GUI element change. In one implementation, the system resource utilization identifiers 852 provide a combination of discrete values that indicate the test environment's processing capacity and the itemized descriptions of the various resources needed to test the corresponding GUI element change.

The economic cost model logic 196 may locate other applicable GUI element change cost rules 846 that depend from a particular GUI element change cost rule 846 identified by a change specifier identifier 850, using dependent change specifier identifiers 856. The dependent change specifier identifiers 865 may identify one or more corresponding GUI element change cost rules 846 that depend from the GUI element change corresponding to the change specifier identifier 850. For example, a change in the class of a parent GUI object from a listbox to a combobox (e.g., SchoolListbox 216 and SchoolCombobox 306) may impose GUI element changes to children GUI objects of the parent GUI object, so that a change specifier identifier 850 corresponding to a particular GAP change specifier 184 and/or synthetic GAP change specifier 185 identifies one or more dependent change specifiers identifiers 856.

In one implementation, the dependency ranking 858 is a value from 0 to 10 that indicates the level of dependency a GAP may have on a particular GUI element. The dependency ranking 858 may correspond to the visibility and scope of a GUI element. For example, the change of the window StateList 202 in the current GAP 150 to School 302 in the subsequent GAP 152, as shown in FIG. 14, may correspond to a dependency ranking 858 of 10, while the change of a value in the StateListbox 212 to a value in the StateListbox 304, as shown in FIG. 5, may correspond to a dependency ranking 858 of 4. The economic cost model logic 196 uses the dependency ranking 858 to facilitate obtaining the GUI transformation costs 848. In one implementation, the economic cost model logic 196 uses the dependency ranking 858 to determine how and/or whether to use the GUI change efficiency factor 886, discussed in further detail below.

In one implementation, the quality ranking 860 is a value from 1 to 10 that indicates the contribution to the quality of the subsequent GAP version 152 made by the GUI element change. For example, a particular GUI element change that enforces integrity checking on a GUI element corresponding to a high dependency ranking 858 value may correspond to a quality ranking 860 of 10. In another example, a GUI element change that is unperceivable and/or corresponds to a low dependency ranking 858 value may correspond to a quality ranking 860 of 0. In one implementation, the economic cost model logic 196 uses a user selectable quality preference identifier to generate the test script transformation cost report 186 with GUI transformation costs 848 corresponding to quality rankings 860 meeting or exceeding the quality preference identifier, so that test plans may be evaluated based on quality factors.

In one implementation, the complexity ranking 862 is a value from 1 to 10 that indicates the difficulty level of testing the corresponding GUI element change, where a complexity level of 10 is a high level of complexity and a level of 0 is a low level of complexity. In another implementation, the complexity ranking 862 indicates the contribution to the level of complexity of the subsequent GAP version 152 made by the GUI element change. For example, a particular GUI element change that enforces integrity checking on a GUI element corresponding to a high dependency ranking 858 value may correspond to a complexity ranking 862 of 10. In another example, a GUI element change that is unperceivable and/or corresponds to a low dependency ranking 858 value may correspond to a complexity ranking 862 of 0. In one implementation, the economic cost model logic 196 uses a user selectable complexity preference identifier to generate the test script transformation cost report 186 with GUI transformation costs 848 to complexity rankings 862 meeting or exceeding the complexity preference identifier, so that test plans may be evaluated based on complexity.

The dependent GUI element change costs 864 may represent an aggregated GUI transformation cost 848 corresponding to the dependent change specifier identifiers 856. In one implementation, the economic cost model logic 196 uses the dependent GUI element change costs 864, rather than retrieving each GUI element change cost rule 846 corresponding to the one or more dependent change specifier identifiers 856, to generate the test script transformation cost report 186.

In one implementation, the economic cost model logic 196 uses user selectable preference identifiers 866 to locate GUI element change cost rules 846 based on discrete values and/or ranges of values for one or more of the system resource utilization identifiers 852, GUI change cost estimate 854, dependency ranking 858, quality ranking 860, complexity ranking 862 and dependent GUI element change costs 864. The preference identifiers 866 identify the GUI transformation costs 848 used to generate the test script transformation cost report 186, based on one or more of the change specifier identifier 850, a system resource utilization identifier 852, a GUI change cost estimate 854 that indicates the estimated time and/or resources (e.g., money and labor) to test a corresponding GUI element change, dependent change specifier identifiers 856, dependency ranking 858, quality ranking 860, complexity ranking 862, and dependent GUI element change costs 864.

The GUI transformation cost 848 may include a time component and resource component. The time component of the GUI transformation cost 848 may indicate the elapsed time needed to change a test script statement and/or test a corresponding GUI element change. The resource component of the GUI transformation cost 848 may indicate the money, areas of skill and/or system infrastructure (e.g., human and technological units) needed to change a test script statement and/or test a corresponding GUI element change.

Recall that the economic cost engine 182 may generate test script transformation cost reports 186 based on multiple combinations of available information, including: 1) GAP change specifiers 184; 2) GAP change specifiers 184 and a current test script 164; 3) GAP change specifiers 184, a current test script 164 and a current GAP version 150 (e.g., a current GAP tree model); 4) a current test script 164, and a GUI difference model 162 with GUI element difference entries; and 5) GAP change specifiers 184, a current test script 164, and a GUI difference model 162. The various combinations of available information are used by the economic cost engine 182 to analyze received GAP change specifiers 184 and/or generated synthetic GAP change specifiers 185 that are used by the economic cost model logic 196 to locate and retrieve GUI transformation costs 848 and generate test script transformation cost reports 186.

In one implementation, the economic cost engine 182 receives GAP change specifiers 184 that the economic cost engine 182 uses to locate and retrieve GUI element change cost rules 848 from the economic models 176 repository. The received GAP change specifiers 184 may have resulted from prior analysis of a current GAP version 150, a current test script 164 and/or a GUI difference model 162. In one implementation, the economic cost engine 182 may receive GAP change specifiers 184 and a current test script 164. The script parser logic 812 produces the test script statement vectors 816 based on the current test script 164. The economic cost model logic 196 analyzes the test script statement vectors 816 to generate synthetic GAP change specifiers 185. The economic cost model logic 196 uses the received GAP change specifiers 184 and generated synthetic GAP change specifiers 185 to locate and retrieve GUI element change cost rules 848 from the economic models 176 repository. In one implementation, the received GAP change specifiers 184 and generated synthetic GAP change specifiers 185 are indistinguishable as to their origin such that the economic cost model logic 196 processes the received GAP change specifiers 184 and generated synthetic GAP change specifiers 185 uniformly, regardless of their origin.

In another implementation, the economic cost engine 182 receives GAP change specifiers 184, a current test script 164 and a current GAP version 150. The economic cost engine 182 analyzes the GAP change specifiers 184 and the current GAP version 150 (e.g., current GAP tree model) to generate synthetic GAP change specifiers 185. The economic cost engine 182 analyzes the test script statement vectors 816 corresponding to the current test script 164 and the GUI difference model 162 to generate synthetic GAP change specifiers 185. The economic cost model logic 196 uses the received GAP change specifiers 184 and generated synthetic GAP change specifiers 185 to locate and retrieve GUI element change cost rules 848 from the economic models 176 repository and generate the test script transformation cost report 186.

In one implementation, the economic cost engine 182 receives a current test script 164 and a GUI difference model 162, without GAP change specifiers 184. The economic cost engine 182 analyzes the test script statement vectors 816 corresponding to the current test script 164 and the GUI difference model 162 to generate synthetic GAP change specifiers 185.

In one implementation, the economic cost engine 182 receives GAP change specifiers 184, a current test script 164, a GUI difference model 162 corresponding to the GAP version 150 and a subsequent GAP version 152. The economic cost engine 182 analyzes the test script statement vectors 816 corresponding to the current test script 164 and the GUI difference model 162 to generate synthetic GAP change specifiers 185. The economic cost engine 182 uses the received GAP change specifiers 184 and generated synthetic GAP change specifiers 185 to locate and retrieve GUI element change cost rules 848 from the economic models 176 repository and generate the test script transformation cost report 186.

In one implementation, the accuracy of the GUI transformation costs 848 varies due to the granularity of the information received by the economic cost engine 182. For example, the GUI transformation costs 848 generated as a result of the economic cost engine 182 receiving GAP change specifiers 184, a current test script 164, and a GUI difference model 162 may have a higher level of accuracy than the GUI transformation costs 848 generated based solely on received GAP change specifiers 184. The economic cost engine 182 may employ various economic models to preserve the accuracy of the GUI transformation costs 848 and compensate for the varying granularities of information provided to the economic cost engine 182.

In one implementation, GAP change specifiers 184 and/or synthetic GAP change specifiers 185 include a model specifier 868, a GUI change frequency 870, skill coefficients 872, complexity identifier 874, quality identifier 876, percent of change 878, wrong path-delete type 880, wrong path-same type 882 and changed element type 884 specifiers. The model specifier 868 specifies one or more economic models to use from among multiple economic models accessible by the economic model logic 196. In one implementation, the model specifier 868 specifies one or more economic models for the economic cost model logic 196 to use corresponding to the varying granularities of information provided to the economic cost engine 182, so that the accuracy of the GUI transformation costs 848 are preserved. For example, the model specifier 868 may specify models corresponding to one or more of the multiple combinations of available information received by the economic cost engine 182, including: 1) model-1 for GAP change specifiers 184; 2) model-2 for GAP change specifiers 184 and a current test script 164; 3) model-3 for GAP change specifiers 184, a current test script 164 and a current GAP version 150; 4) model-4 for a current test script 164 and a GUI difference model 162 with GUI difference entries 810; and 5) model-5 for GAP change specifiers 184, a current test script 164, and a GUI difference model 162 with GUI difference entries 810.

The GUI change frequency 870 indicates the number of occurrences of a particular GUI element change. In one implementation, the economic cost model logic 196 includes a user adjustable GUI change efficiency factor 886 that indicates whether a GUI change frequency 870 above a particular threshold results in a lower GUI transformation cost 848. For example, a GUI change efficiency factor 886 of 0.50 indicates that the GUI transformation cost 848 for each change above a threshold of 100 occurrences for a given GUI element change are adjusted by 50 percent. In other words, where a particular GUI element change is identified to have 120 occurrences, the economic cost model logic 186 applies the GUI change efficiency factor 886 of 0.50 to the GUI transformation cost 848 for the 20 changes above the threshold of 100. In another example, a GUI change efficiency factor 886 of 0.00 may indicate that no efficiency is realized regardless of the GUI change frequency 870 value.

In one implementation, the skills coefficients 872 include one or more coefficients that are used to describe the level of experience of the testers who are expected to test the subsequent GAP version 152. The skills coefficients 872 may include individual coefficients for specific areas of testing experience. For example, the skills coefficients 872 may correspond to the skill and experience level of testers according to particular phases of testing such as unit, integration, system and final test phase so that each phase is represented by one or more coefficients. In another example, the skills coefficients 872 may correspond to skills and experience corresponding to testing particular aspects of the subsequent GAP version 152, such as security and user authentication, numerical computations specific to the GAP, and network and infrastructure.

In another implementation, the skills coefficients 872 are calibrated based on performance metrics located in a performance metrics repository 198 and/or cost reports repository 888. GAP change specifiers 184 and/or synthetic GAP change specifiers 185 may be constructed and/or generated from historical performance metrics found in a performance metrics repository 198 and/or cost reports repository 888. The skills coefficients 872 of the constructed GAP change specifiers 184 and/or synthetic GAP change specifiers 185 may be adjusted over multiple iterations to obtain GUI transformation costs 848 and test script transformation cost reports 186 that are within acceptable margins of variance to the actual costs reflected in the performance metrics repository 198. The accuracy of the GUI transformation costs 848 obtained by the economic cost model logic 196 may be based on how well the skills coefficients 872 are calibrated to reflect the testing resources available to test the subsequent GAP version 152. In one implementation, the skills coefficients 872 influence the complexity identifier 874, discussed in further detail below.

The economic cost model logic 196 uses the skills coefficients 872 to obtain the GUI transformation costs 848. For example, a skills coefficient 872 value of 1.0 may indicate that testers with little experience are expected to be used to test the subsequent GAP version 152 and higher GUI transformation costs 848 may result to reflect the low experience. In another example, a skills coefficient 872 value of 8.0 may indicate testers with higher than average testing experience and lower GUI transformation costs 848 may result that reflect the higher than average experience. The economic cost model logic 196 may analyze whether the skills coefficients 872 and complexity ranking 862 correlate, and obtain correspondingly higher or lower GUI transformation costs 848. For example, the skills coefficients 872 may indicate that the testers are capable of testing a GAP with a particular level of complexity, as indicated by the complexity ranking 862, so that lower GUI transformation costs 848 are obtained. In another example, the skills coefficients 872 may indicate that the testers lack a skill and experience level for testing a GAP with a particular level of complexity corresponding to the complexity ranking 862, so that higher GUI transformation costs 848 are obtained to reflect the lack of skills and experience of the testers and the expected time and resources to test the subsequent GAP version 152.

In one implementation, the complexity identifier 874 numerically identifies the level of complexity of a GUI element change (e.g., values 0 to 10), determined by the economic cost model logic 196, corresponding to a generated synthetic GAP change specifier 185. In another implementation, the complexity identifier 874 identifies the level of complexity determined by a tester and received by the economic cost model logic 196 with the GAP change specifier 184. Distinguishing the complexity identifier 874 of the GAP change specifier 184 and/or synthetic GAP change specifier 185 from the complexity ranking 858 of the GUI element change cost rule 846, the complexity identifier 874 represents analysis that is external to the economic models 176 repository. The economic cost model logic 196 may analyze the complexity ranking 862 and complexity identifier 874 to assess the accuracy of the GUI transformation costs 848 obtained by applying the GUI element change cost rule 846.

For example, the economic cost model logic 196 may determine that the complexity ranking 862 and complexity identifier 874 corresponding to a particular GUI element change are within an acceptable margin of variance such that the GUI transformation cost 848 is not adjusted as a result. In another example, the economic cost model logic 196 may determine that the complexity ranking 862 and complexity identifier 874 corresponding to a particular GUI element change are outside of an acceptable margin of variance and the GUI transformation costs 848 are adjusted upward by a multiplier. The margin of variance and the multiplier, determined by analyzing the complexity ranking 862 and complexity identifier 874, may be user selectable and/or adjustable. In one implementation, the complexity identifier 874 is based on the skills coefficients 872 such that the complexity of a GUI element change is assessed relative to the skills and experience of the available testers. The skills coefficients 872 may be calibrated so that the complexity ranking 862 and the complexity identifier 874 generated by the economic cost model logic 196 are within an acceptable margin of variance.

In one implementation, the quality identifier 876 numerically identifies the level of quality contributed to by a GUI element change (e.g., values 0 to 10), determined by the economic cost model logic 196, corresponding to a generated synthetic GAP change specifier 185. In another implementation, the quality identifier 876 identifies the level of quality determined by a tester and received by the economic cost model logic 196 with the GAP change specifier 184. Distinguishing the quality identifier 876 of the GAP change specifier 184 and/or synthetic GAP change specifiers 185 from the quality ranking 860 of the GUI element change cost rule 846, the quality identifier 876 represents analysis that is external to the economic models 176 repository. The economic cost model logic 196 may analyze the quality ranking 860 and quality identifier 876 to assess the accuracy of the GUI transformation costs 848 obtained by applying the GUI element change cost rule 846. For example, the economic cost model logic 196 may determine that the quality ranking 860 and quality identifier 876 corresponding to a particular GUI element change are within an acceptable margin of variance such that the GUI transformation cost 848 is not adjusted as a result. In another example, the economic cost model logic 196 may determine that the quality ranking 860 and quality identifier 876 corresponding to a particular GUI element change are outside of an acceptable margin of variance and the GUI transformation costs 848 are adjusted upward by a multiplier. The margin of variance and the multiplier, determined by analyzing the quality ranking 860 and quality identifier 876, may be user selectable and/or adjustable.

In one implementation, the economic cost engine 182 receives a GAP change specifier 184 that includes a percent of change 878 value, a current test script 164 and a current GAP tree model corresponding to a current GAP version 150 that the economic cost engine 182 uses to generate synthetic GAP change specifiers 185, and locate and retrieve GUI element change cost rules 848 from the economic models 176 repository. For example, the economic cost model logic 196 analyzes the current GAP version 150 (e.g., represented by a current GAP tree model) and generates synthetic GAP change specifiers 185 that reflect a percentage of change to the current GAP version 150 corresponding to the percent of change 878 value (e.g., ranging from 1 to 100). The economic cost model logic 196 analyzes the current GAP version 150 and identifies a set of proposed GUI elements changes that correspond to the percent of change 878 value. The economic cost model logic 196 may identify the proposed GUI elements by analyzing the GUI elements in the GAP tree model of the current GAP version 150 in a random order, the order in which the GUI elements are presented in the tree model from top to bottom or from bottom to top.

In one implementation, the proposed GUI element changes may be determined based on the complexity identifier 874 and/or quality identifier 876 included in the received GAP change specifier 184. For example, the economic cost model logic 196 receives a GAP change specifier 184 that includes a complexity identifier 874 value of 1 and quality identifier 876 value of 2, and for each of the proposed GUI elements to be changed, determines proposed changes corresponding to the complexity identifier 874 value of 1 and the quality identifier 876 value of 2. The economic cost model logic 196 may locate, in the performance metrics repository 198 and/or cost reports repository 888, proposed GUI element changes corresponding to the complexity identifier 874 values and the quality identifier 876 values. In one implementation, the economic cost model logic 196 generates synthetic GAP change specifiers 185, as a result of analyzing the proposed GUI element changes. In another implementation, the economic cost model logic 196 identifies proposed GUI element changes corresponding to the complexity identifier 874, the quality identifier 876 and skill coefficients 872.

The economic cost model logic 196 analyzes the current test script 164 and GUI difference model 162 to generate synthetic GAP change specifiers 185 based on validated GUI element changes (e.g., GUI element difference entries). For example, the economic cost model logic 196 determines test script statement vectors 816 that need modification because GUI objects that are referenced in the current test script 164 and exist in the current GAP version 150 that do not exist in the subsequent GAP version 152, and the economic cost model logic 196 generates synthetic GAP change specifiers 185 that reflect the needed changes to the current test script 164. The economic cost model logic 196 identifies changes to test script statement vectors 816 that set the values of GUI objects that are compatible with the class of that GUI objects, so that constraints imposed on the GUI objects as a result of a change are not violated. In one implementation, the economic cost model logic 196 verifies that incorrect operations are not specified by GAP change specifiers 184 and/or synthetic GAP change specifiers 185 used to obtain GUI transformation costs 848.

The economic cost model logic 196 may infer GUI class information regarding a GUI object that is present in a navigation path of test script statement vectors 816, and whose presence is not explicitly defined. For example, when the test script statement vector 816 employs expressions that identify GUI objects whose values can only be determined at runtime, the OR lookup logic 172 may use path traversal logic 824 to identify the possible corresponding GUI object entries 822 and GUI element difference entries 810 in the object repository 174 and GUI difference model 162, respectively. The economic cost model logic 196 then identifies the valid GUI object entries 822 that may substitute for the expressions and GUI element difference entries 810 that satisfy valid test script statement vectors 816, and the economic cost model logic 196 generates corresponding synthetic GAP change specifiers 185.

For example, consider the test script statement vector 816: VBWindow("s").VBWindow(e1).VBWindow(e2).VBWindow("d"), where the source node GUI object is named "s", the destination node GUI object is named "d", but expressions e1 and e2 compute values of intermediate nodes in the navigation path at runtime. The traversal logic 824 determines intermediate nodes (GUI objects) that may be included in the possible navigation paths identified by the source node "s" and destination node "d". The path traversal logic 824 analyzes the GUI difference model 162 to identify possible constant substitutions for e1 and e2, for example, "a" and "f", so that the test script statement vector 816 formed by the substitute GUI objects in the navigation path expression "s.a.f.d" can be validated by economic cost model logic 196. By identifying the possible navigation paths leading to the destination node d starting with the source node 's' the economic cost model logic 196 can conclude whether to generate a synthetic GAP change specifier 185 based on the substitute GUI objects. In the event the traversal logic 824 does not identify at least one navigation path, then the transformed test script statement 828 is invalid. Alternatively, in the event the traversal logic 824 identifies navigation paths leading from 's' to 'd' by traversing two objects (e.g., e1 and e2), then the transformed test script statement 828 may be valid provided that expressions e1 and e2 evaluate to the names of the nodes in the discovered navigation paths. The traversal logic 824 infers the possible names computed by expressions e1 and e2 at compile time. In other words, there is a direct correlation between the complexity of test scripts and the economic cost to transform test scripts and use those test scripts to test subsequent GAP versions 152. The complexity is a function of the number of referenced GUI objects and operations on the GUI objects, as well as the amount of logic needed to process the data that is extracted and placed into those GUI objects.

Figure 16:
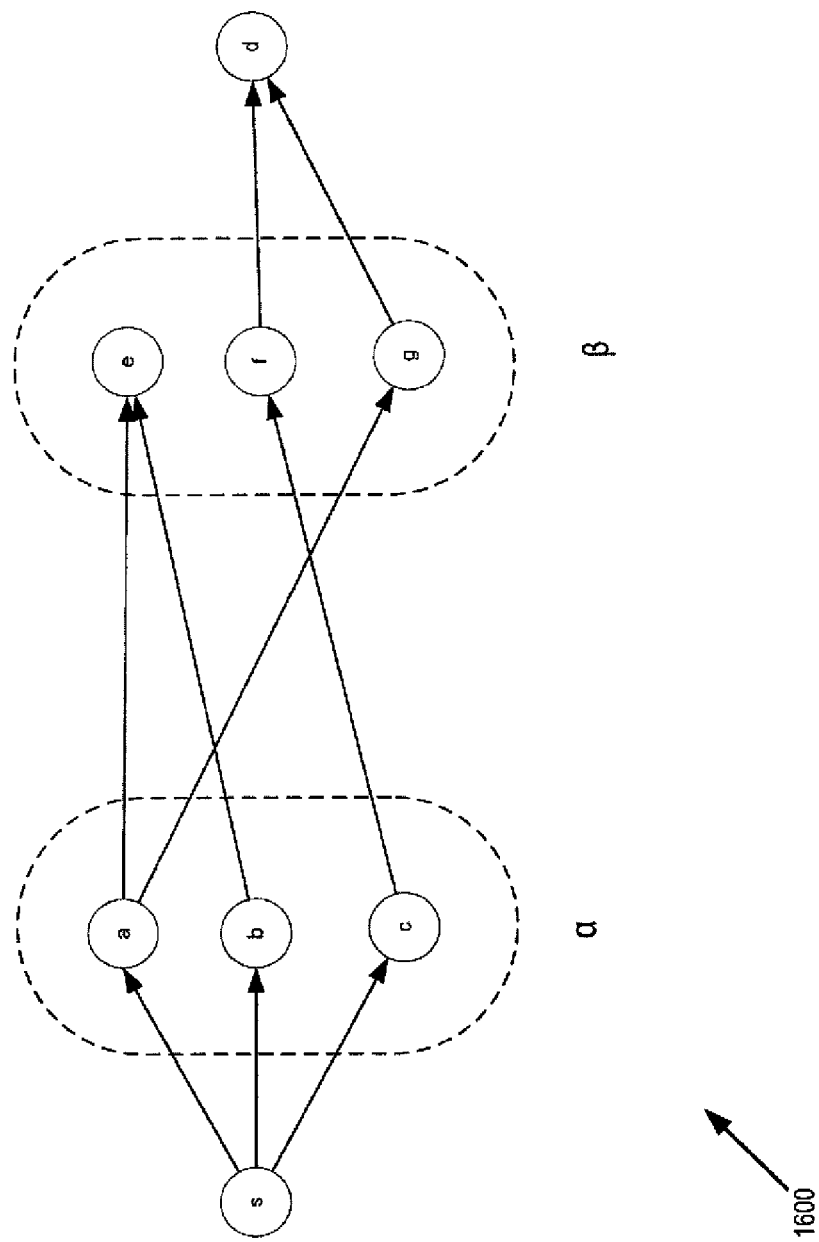
FIG. 16 illustrates navigation paths from a source to a destination object.

A formal description of the traversal logic 824 is provided with reference to FIG. 16. Expressions e1 and e2 may be replaced with the object name variables a and $\beta$ correspondingly, and the original expression is converted into traversal strategy $S = s \rightarrow = \rightarrow \beta \rightarrow d$. The function 'first(s)' computes a set of edges that can be traversed from node s. These edges lead to a set of objects designated by the variable a. Function 'first(s)' may be computed using a graph reachability algorithm, included in the path traversal logic 824, and the path traversal logic 824 returns edges that may navigate to the destination node. According to FIG. 16, $\alpha = \{a, b, c\}$. Then for each element of a, function 'first' may be computed. As a result, β={e, f, g} are obtained, where 'first(a)'={e, g}, 'first(b)'={e}, and 'first(c)'={f}, and 'first(e)'={Ø}, 'first(f)'={d}, and 'first(g)'={d}. From the computed node values the path traversal logic 824 forms a work-list W that includes a set of all computed paths, W={(s, a, e), (s, a, g, d), (s, b, e), (s, c, f, d)}. The path traversal logic 824 analyzes each navigation path of W to determine whether the navigation path contains nodes 's' and 'd'. Navigation paths identified by the path traversal logic 824 to include nodes 's' and 'd', as source and destination nodes, are considered as valid navigation paths. In the event no navigation paths are identified by the traversal logic 824, then the test script statement vector 816 is invalid because the target GUI element cannot be reached starting from the specified beginning GUI element.

Referring again to FIG. 16, an example of an invalid expression is VBWindow("s").VBWindow(e1). VBWindow(e2).VBWindow(e3).VBWindow("d"). All navigation paths between nodes s and d have at most two objects. Therefore, no matter what values are computed at runtime for expressions e1, e2, and e3 the expressions cannot represent objects in a valid navigation path between the source and the destination objects. Another example of an invalid expression is VBWindow("s").VBWindow("b").VBWindow(e1).VBWindow("d"), because no value for the expression e1 exists that makes the navigation path valid (i.e. that forms a complete path from 's' to 'd').

The economic cost model logic 196 may infer GUI class information regarding GUI objects that are present in the navigation path of test script statement vectors 816. The economic cost model logic 196 identifies GAP change specifiers 184 and/or synthetic GAP change specifiers 185 that resolve test script statement vectors 816 that attempt to access GUI objects that do not exist in a subsequent GAP version 152 and/or attempt to set a value of a GUI object that is not compatible with the type of the GUI object. The economic cost model logic 196 type checks test script statement vectors 816 against the GUI difference model 162 before generating corresponding GAP change specifiers 184.

The economic cost model logic 196 uses inheritance and sub-typing relations between classes of GUI objects to validate received GAP change specifiers 184 and generate valid synthetic GAP change specifiers 185. The concept of class includes hierarchical containments (e.g., GUI scopes and system hierarchies). The object repository 174 and the GUI difference model 162 include GUI class information (e.g., annotating the classes of GUI objects) for each GUI object entry 822 and GUI element difference entry 810. For example, referring to line 1 of Table 7, the SchoolListBox is a WinObject class with properties listed at lines 3-39. In another example, referring to FIGS. 5, 14 and 15, at line 1 of each GUI difference entry (e.g., 504, 1404 and 1504) the GUIElement Type is indicated. The class of each GUI object is indicated as shown in FIGS. 5, 14 and 15 at lines 7, 8 and 8, respectively. The class of a GUI object indicates that the GUI object includes particular attributes, properties and/or traits in common with other GUI objects of the same class that may be extended to and/or inherited by child GUI objects. For example, FIG. 5 at line 7 indicates that the StateListbox GUI object is of a WindowsForms10.ListBox.app4 class that includes values, as indicated at line 11 of FIG. 5. In other words, one property of GUI objects of WindowsForms10.ListBox.app4 is that these GUI objects are expected to have values. Class is a concept that a GUI framework uses to classify GUI objects. For example, class ListBox defines shape, functionality, and the rules of interactivity for GUI objects of this class. Assigning classes to GUI objects facilitates the economic cost model logic 196 to trace changes between successive GAP versions (e.g., 150 and 152) and perform extended checking on the correctness of operations on GUI objects.

Referring again to FIG. 8, in one implementation, the economic cost model logic 196 determines whether a GUI object has changed and sets the GUI element change status 834. For example, the GUI element change status 834 may use a numerical indicator of 0, 1, and 2, respectively, to indicate no change, and a change with and without a particular constraint violation. The economic cost model logic 196 may use the GUI element change status 834 to facilitate identifying the appropriate GAP change specifiers 184 and/or synthetic GAP change specifiers 185.

In another implementation, the GUI element change status 834 is a message that provides a detail description of a change. The GUI element change status 834 may also indicate with a numerical indicator (e.g., −1) that the GUI object has been deleted from the subsequent GAP version 152. When a GUI object has been deleted from the subsequent GAP version 152, the economic cost model logic 196 generates one or more synthetic GAP change specifiers 185 that specify corresponding changes to the current test script 164 and the current GAP version 150. In one implementation, the economic cost model logic 196 generates synthetic GAP change specifiers 185 that correspond to different, but programmatically equivalent, approaches to changing the current test script 164 and the current GAP version 150, so that a programmer may evaluate the GUI transformation costs 848 and test script transformation cost report.

Figure 9:
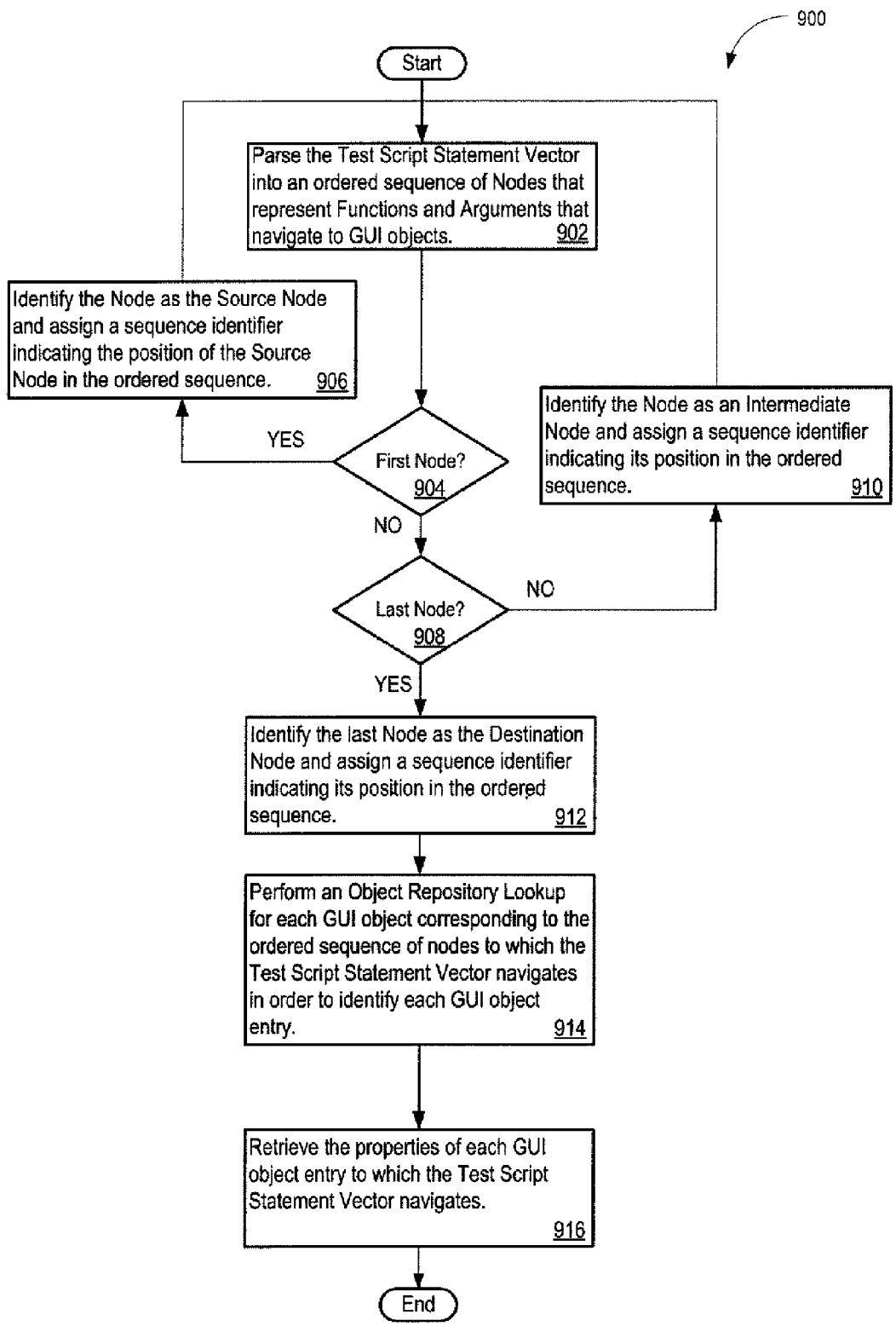
FIG. 9 shows a flow diagram for retrieving the properties of a GUI object entry from an object repository (OR).

FIG. 9 shows a flow diagram 900 for retrieving the properties of a GUI object entry 822 from an object repository (OR) 174. The script parser logic 812 parses the test script statement vector 816 into an ordered sequence of nodes that represent functions and arguments that navigate to GUI objects (902). The script parser logic 812 evaluates the first node of the ordered sequence of nodes (904), and identifies the first node as the source node and assigns a sequence identifier indicating the position of the source node in the ordered sequence (906). The script parser logic 812 evaluates the next node of the order sequence of nodes to determine whether the next node is the last node (908), and identifies the next node as an intermediate node when the next node is not the last node (910). The intermediate node is assigned a sequence identifier indicating the position of the intermediate node in the ordered sequence. The script parser logic 812 may identify all intermediate nodes between the source node and the destination node.

The script parser logic 812 identifies the last node in the ordered sequence as the destination node and assigns a sequence identifier to the destination node that indicates the position of the destination node in the ordered sequence (912). The OR lookup logic 172 performs an object repository lookup for each GUI object corresponding to the ordered sequence of nodes to which the test script statement vector navigates so that each GUI object entry 822 is identified (914). In one implementation, the ordered sequence of nodes is used by the path traversal logic 824 and economic cost model logic 196 to validate the statements of the current test script 164, and/or validate received GAP change specifiers 184 and generate valid synthetic GAP change specifiers 185. In one implementation, the economic cost engine 182 uses the ordered sequence of nodes to infer GUI class and inheritance (subclass) information for GUI objects. Where at least one of the source, destination and/or the intermediate nodes are expressions that can only be identified at run-time, the path traversal logic may identify possible GUI object entries 822, and the economic cost model logic 196 determines the GUI object entries 822 that satisfy the test script statement vector 816. The OR lookup logic 172 retrieves the properties of the GUI object entries 822 to which the test script statement vector navigates (916).

Figure 10:
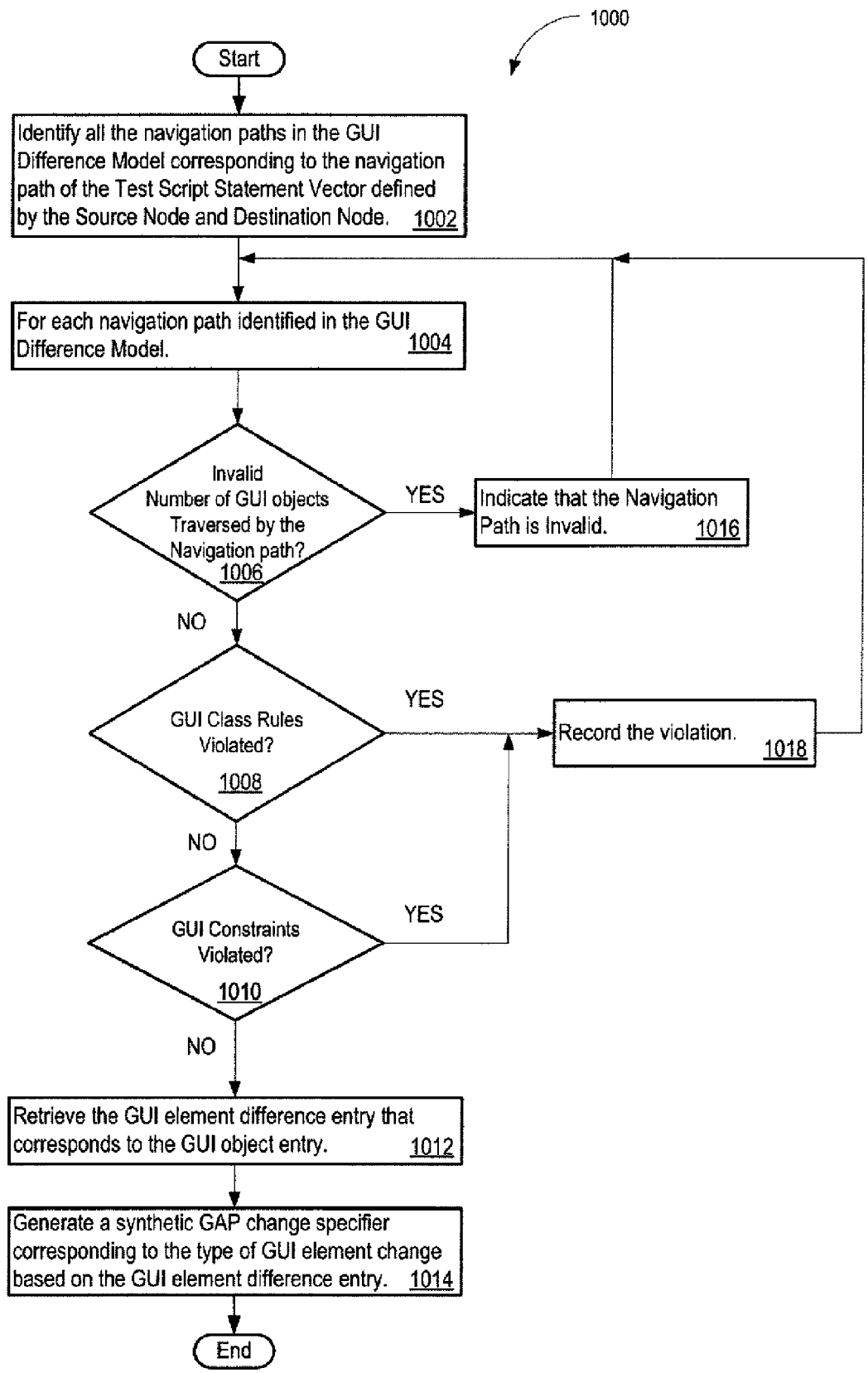
FIG. 10 shows a flow diagram for identifying a GUI difference entry corresponding to a GUI object entry.

FIG. 10 shows a flow diagram 1000 for identifying a GUI difference entry 810 corresponding to a GUI object entry 822. The OR lookup logic 172 receives the properties of the GUI objects corresponding to the source, destination and all intermediate nodes of the test script statement vector 816. In one implementation, the OR lookup logic 172 employs the path traversal logic 824 to identify possible GUI difference entries 810 corresponding to the navigation paths identified by a source node and a destination node to which a test script statement vector navigates (1002). Where at least one of the GUI element difference entries 810 is an expression that can only be identified at run-time, the path traversal logic 824 identifies one or more possible GUI difference entries 810 that form a navigation path between the source node and the destination node (1004). The path traversal logic 824 determines whether the GUI difference entries 810 form a valid navigation path between corresponding source and destination nodes GUI difference entries 810 (1006). The GUI economic cost model logic 196 determines whether the GUI difference entries 810 that form the navigation path are valid (1008).

The economic cost model logic 196 identifies the GUI element difference entries 810 that correspond to each of the GUI object entries 822 forming a valid navigation path (1010). The economic cost model logic 196 determines the synthetic GAP change specifiers 185 to generate and/or validates the GAP change specifiers 184 based on the type of GUI element change (e.g., 880, 882, 884 and/or GUI element change status 834), based on analyzing the GUI object entry 822 and GUI element difference entry 810 (1012). The economic cost model logic 196 generates valid synthetic GAP change specifiers 185 corresponding to the type of GUI element change identified. When the path traversal logic 824 identifies a navigation path that traverses an invalid number of GUI element difference entries 810 between corresponding source and destination node GUI difference entries 810, the path traversal logic 824 indicates that the navigation path is invalid (1014).

FIG. 11 shows a transformed test script 178 for the subsequent GAP version 152. The economic cost model logic 196 may generate synthetic GAP change specifiers 185 that specify the changes needed to obtain the transformed test script 178. For example, the economic cost model logic 196 generates synthetic GAP change specifiers 185 for lines 1-3 of the current test script 164, shown in FIG. 6, corresponding to transformed test script lines 1, 5-7, shown in FIG. 11. In one implementation, the GUI difference model 162 and the GUI element metadata provide the GUI class, GUI typing and mapping information necessary for the economic cost model logic 196 to infer lines 2-4 of the transformed test script 178, given that the "university.data" in line 6 represents a destination in a path traversal from which valid GAP change specifiers 184 and/or synthetic GAP change specifiers 185 may be determined. In another example, the GUI difference model 162 and/or the GUI element metadata include GUI class and mapping information that the economic cost engine 182 uses to generate one or more synthetic GAP change specifiers 185 that specify how to transform line 16 of the current test script 164, as shown in FIG. 6, that refers to WinObject "Save File" into lines 24-25 that refer to a "Save File" child GUI object of the WinObject "menuStrip1".

Figure 12:
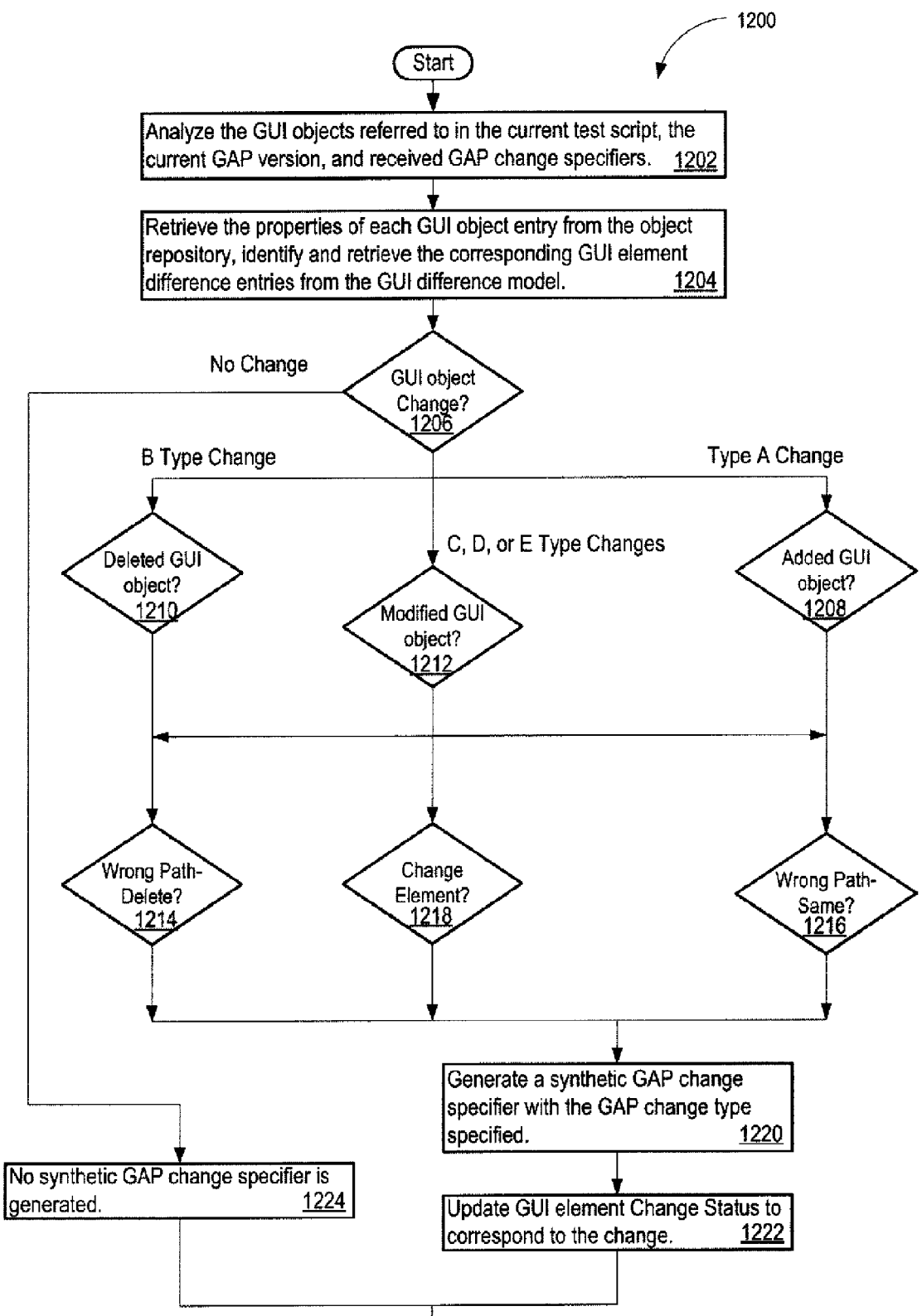
FIG. 12 shows a flow diagram for generating a synthetic GAP change specifier.

FIG. 12 shows a flow diagram 1200 for generating a synthetic GAP change specifier 185. In one implementation, the economic cost model logic 196 validates GAP change specifiers 184 and/or generates synthetic GAP change specifiers 185 that specify the type of GUI object changes between successive releases of GAPs, including: (A) a new GUI object added to a subsequent GAP version 152; (B) a GUI object is deleted from a subsequent GAP version 152; (C) the values of one or more attributes of a GUI object are modified; (D) the values of a GUI object are modified between successive GAP versions; and (E) the type of a GUI object is different. The economic cost engine 182 analyzes the GUI objects referred to in the current test script 164, the current GAP version 150 and the GAP change specifiers 184 (1202). The economic cost engine 182 retrieves the properties of each GUI object (e.g., GUI object entries 822) from the object repository 174, and locates a corresponding GUI element difference entry 810 in the GUI difference model 162 (1204). In one implementation, the economic cost engine 182 receives a current GAP tree model representation of a current GAP version 150 from the GUI difference model 162 and GAP change specifiers 184, and generates synthetic GAP change specifiers 185, using GAP change specifier logic 890. The economic cost model logic 196 analyzes the GUI object changes (1206).

GUI object changes of types A (1208) and B (1210) occur when GUI objects are added and removed correspondingly from current GAP version 150 and subsequent GAP version 152. For example, adding the WinObject menustrip1 308 to the subsequent GAP version 152 is a type A change, while removing the WinObject "Select School" 204 is a type B GUI object change. Referring to FIG. 4, notice that the "Select School" has been removed at 412.

An example of a type C change (1212) is the change of the window name from StateList 202 to School 302. Adding or removing values from GUI objects such as list and combo boxes are examples of modifications of the type D change (1212). For example, the listbox StateListbox 212 in current GAP version 150 is identified in the subsequent GAP version 152 as StateListbox 304, and referring to the GUI difference entry 504 the values for SeqNumber="8" are "District of Columbia" and "Florida" for successive GAP versions, respectively. Changing the "type" of a GUI object may include replacing a class of the window that is used to represent the object and/or changing the high-level concept that describes the values that the GUI object takes. For example, changing the type of the static label to a read-only combo box is a modification of the type E (1212). Another example of a type E change includes the change of the listbox "SchooListbox" 216 to a combobox "SchoolCombobox" 306.

The economic cost model logic 196 receives GAP change specifiers 184 and generates synthetic GAP change specifiers 185 that include wrong path-delete type 880 wrong path-same type 882 and changed element type 884 specifiers. Wrong path-delete type 880 specifies that a GUI object in the current GAP version 150 may have been deleted in the subsequent GAP version 152 (e.g., see "Select School" 218 and 412 as shown in FIG. 4), although the current test script 164 refers to the GUI object (1214). Wrong path-same type 882 specifies that a GAP change may result in a read and/or write to the wrong GUI object. For example, a method may be invoked on the wrong GUI object based on a particular GAP change. Wrong path-same type 882 specifies that a GUI object in a current GAP version 150 has been modified and/or another GUI object has been added to the subsequent GAP version 152 that may result in the wrong GUI object being navigated to by a test script statement (1216).

For example, consider the statement in lines 2 and 6 of the current test script 164 and transformed test script 178, respectively:

Window("StateList").Dialog("Open").WinListView ("SysListView32").Select "university.data".

The statement selects "university.data" from a WinListView "SysListView32". However, lines 2-4 of the transformed test script 178 may navigate to and invoke the Select method on the wrong GUI object "university.data", because the GUI objects referenced in lines 2-4 of the transformed test script 178 are new GUI objects that are not referenced in the current test script 164. Thus, when the properties of existing GUI objects are modified and/or other GUI objects are added into a subsequent GAP version 152, the result of interference of these operations is that transformed test script statements that result from applying GAP change specifiers 184 and/or synthetic GAP change specifiers 185 to current test script statement vectors 816 may access and read values of objects that are different from those as originally intended.

Changed-element 884 specifies that the type, properties, and/or default values of a GUI object referenced by a test script statement vector 816 have changed in the subsequent GAP version 152 (1218). For example, the GUI difference entry 504 indicates that there are different values for SeqNumber="8" are "District of Columbia" and "Florida" for successive GAP versions, and the economic cost model logic 196 may generate a synthetic GAP specifier 185 that includes a change-element 884 correspondingly. Change-element 884 may also specify that new constraints have been imposed on a GUI object that conflict with test script statement vectors 816, for example, attempting to write data to a previously writable text box that has been changed to a read-only text box. Referring to the GUI element difference entry shown in Table 8, the WinObject "AcadScale" referred to in the current test script 164 at line 8 is an editable object that has been transformed into the WinObject "Academics (1-5)" in the subsequent GAP version 152 where the object is read-only. The economic cost model logic 196 validates GAP change specifiers 184 and/or generates the synthetic GAP change specifier 185 with the GAP change type specified (1220) and the GUI element change status 834 is updated (1222). In one implementation, the economic cost model logic 196 does not generate synthetic GAP change specifiers 185 for GUI objects that have not changed between successive GAP versions (1224).

TABLE 8

GUI Element Difference entry for AcadScale

```
<GUIElement Type = "AcadScale Textbox">
<Version> 0
 - <GUIElement Alias="AcadScale">
    <UniqueID>0xcb</UniqueID>
    <HWND>0x1a0b3c</HWND>
    <Location x="573" y="790" width="32" height="23" />
    <Class>WindowsForms10.EDIT.app4</Class>
    <Style>0x560100c0</Style>
    <ExStyle>0xc0000a00</ExStyle>
 - <GUIElement Alias="AcadScale">
    <UniqueID>0x4</UniqueID>
    <HWND>0x1a0b3c</HWND>
    <Location x="575" y="792" width="28" height="19" />
    <Class>WindowsForms10.EDIT.app4</Class>
    <Style>0x560100c0</Style>
    <ExStyle>0xc0000a00</ExStyle>
    - <Values>
    <Value SeqNumber="3" />
    </Values>
</GUIElement>
```

TABLE 8-continued

GUI Element Difference entry for AcadScale

```
</GUIElement>
</Version>
<Version> 1
 - <GUIElement Alias="Academics (1-5)">
    <UniqueID>0x2ff</UniqueID>
    <HWND>0x70d0e</HWND>
    <Location x="597" y="388" width="111" height="17" />
    <Class>WindowsForms10.STATIC.app.0.378734a</Class>
    <Style>0x5600000d</Style>
    <ExStyle>0xc0000800</ExStyle>
 - <GUIElement Alias="Academics (1-5)">
    <UniqueID>0x308</UniqueID>
    <HWND>0x70d0e</HWND>
    <Location x="597" y="388" width="111" height="17" />
    <Class>WindowsForms10.STATIC.app.0.378734a</Class>
    <Style>0x5600000d</Style>
    <ExStyle>0xc0000800</ExStyle>
    - <Values>
    <Value SeqNumber="3">Academics (1-5)</Value>
    </Values>
   </GUIElement>
  </GUIElement>
 </Version>
</GUIElement>
```

Knowing the modification type for a GUI object facilitates the economic cost model logic 196 to determine the appropriate synthetic GAP change specifiers 185 to generate and/or validate received GAP change specifiers 184. For example, the economic cost model logic 196 may validate GAP change specifiers 184 and/or generate one or more synthetic GAP change specifiers 185 that specify changes to test script statement vectors 816 that attempt to set values in a text box object that has been changed to a read-only combo box. GAP change specifiers 184 and/or synthetic GAP change specifiers 185 may specify that the test script statement vector 816 be modified (transformed) to select values in the combo box using appropriate interfaces rather than attempting to set values in the text box.

The economic cost model logic 196 determines whether GUI objects have been removed from a current GAP version 150 and locates the test script statement vectors 816 that reference these removed objects in the current test script 164. The economic cost engine 182 refers to these statements as first-reference statements (FRS). The variables used in these statements are obtained, and the statements that use the variables whose values are defined in the FRSs are referred to as secondary reference statements (SRS). The economic cost model logic 196 determines whether GUI objects may have been deleted in the subsequent GAP version 152, and validates received GAP change specifiers 184 and generates one or more corresponding synthetic GAP change specifiers 185 with a wrong path-delete 884. When a statement of the current test script 164 refers to a variable whose value points to a removed GUI object, the statement of the current test script 826 is considered an SRS. In one implementation, the economic cost engine 182 generates one or more synthetic GAP change specifiers 185 and/or validates received GAP change specifiers 184 corresponding to the identified SRSs.

When the values of one or more attributes of a GUI object are modified, a type C modification is performed. FRSs and SRSs are identified for the GUI object with the modified attributes, and corresponding synthetic GAP change specifiers 185 are generated and/or received GAP change specifiers 184 are validated. When the values of GUI objects are added or removed, modifications of the type D occur. After locating FRSs that reference GUI objects whose values have been changed, SRSs are found and the economic engine 182 determines the impact due to the SRSs. When the type of a GUI object is modified then a modification of the type E occurs that involves locating FRSs, checking the new types of the GUI object, invoking corresponding type sub-sumption rules. The economic cost model logic 196 may analyze the modified GUI objects to determine whether to generate synthetic GAP change specifiers 185 with change-element type 884 where GUI objects whose types, properties, or default values are changed in a subsequent GAP version 152, and/or attempting an operation on a GUI object that does not take into consideration new constraints imposed on the elements of the GUI object.

The economic cost model logic 196 analyzes each GUI object referred to in the current test script 164, the current GAP version 150, received GAP change specifiers 184, generated synthetic GAP change specifier 185, and/or GUI element change status 834. The economic cost model logic 196 locates, in the economic models 176 repository, the economic model specified by the model specifier 868, and retrieves a GUI element change cost rule 846 with a change specifier identifier 850 corresponding to the GAP change specifier 184 and/or synthetic GAP change specifier 185. In one implementation, the economic cost model logic 196 combines one or more attributes of a GUI object (e.g., type and/or class) with the GUI element change status 834, the model specifier 868, the wrong path-delete type 880, wrong path-same type 882 and/or changed element type 884 to form a unique identifier used to locate a corresponding change specifier identifier 850 in the economic model specified by the model specifier 868.

The economic model logic 196 analyzes the GUI element change cost rule 846 components, GAP change specifier 184 and/or synthetic GAP change specifier 185 components, preference identifiers 866 and GUI change efficiency factor 886 to determine whether to adjust the GUI change cost estimate 854. For example, the economic cost model logic 196 adjusts the GUI change cost estimate 854 based on whether the skills coefficients 872, complexity identify 874, quality identifier 876, system resource utilization identifiers 852, quality ranking 860, and/or complexity ranking 862 are within an acceptable variance as specified by the preference identifiers 866. The economic cost model logic 196 obtains the GUI transformation cost 848 based on the adjusted GUI change cost estimate 854. In other words, the GUI change cost estimate 854 is adjusted to obtain the GUI transformation cost for the GAP change specifier 184 and/or synthetic GAP change specifier 185. The economic cost model logic 196 processes each received GAP change specifier 184 and/or generated synthetic GAP change specifier 185 to obtain the corresponding GUI transformation costs 848 and generates the test script transformation cost report 186 with the GUI transformation costs 848.

Figure 13:
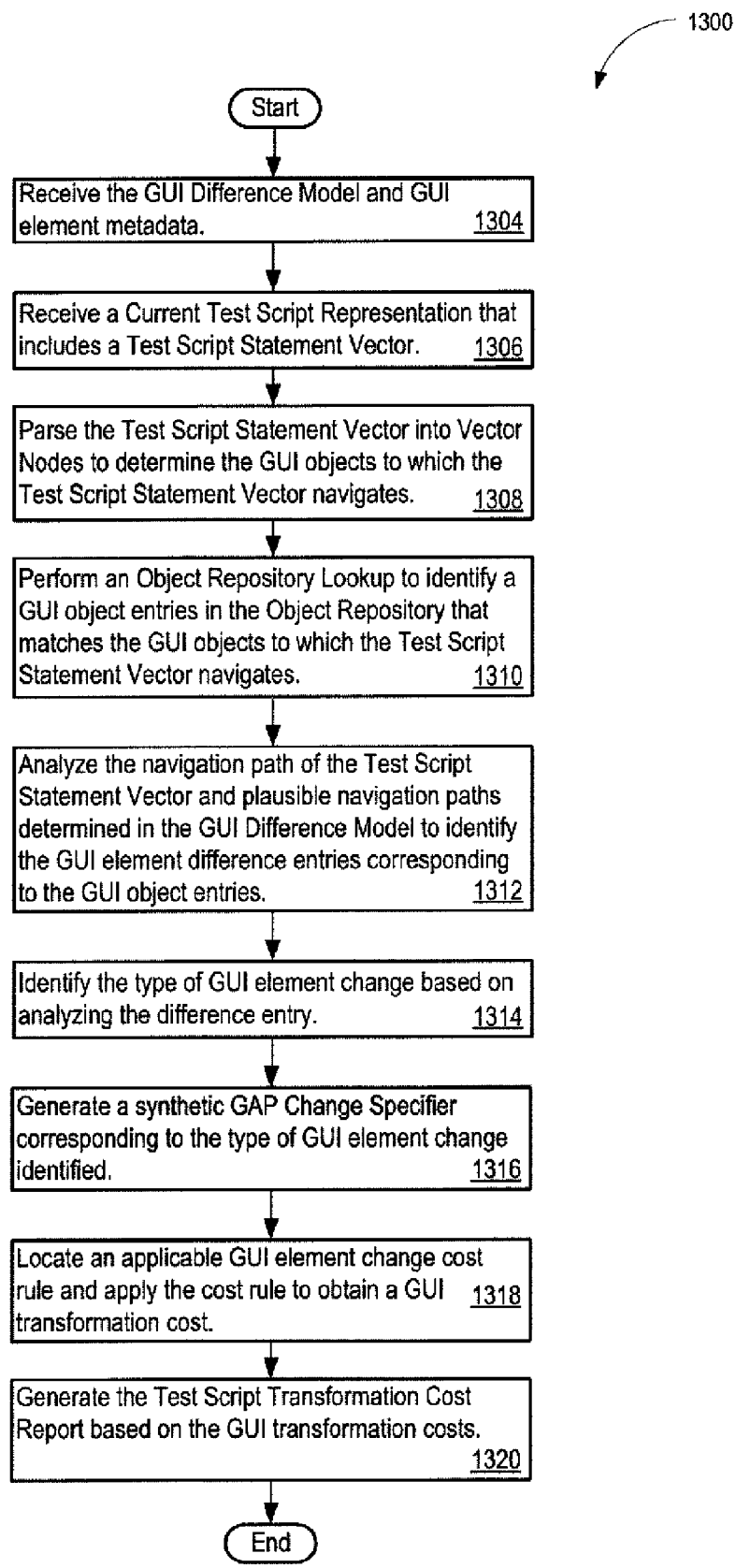
FIG. 13 shows a flow diagram for outputting a test script transformation cost report based on a GUI difference model.

FIG. 13 shows a flow diagram for outputting a test script transformation cost report 186 based on a GUI difference model 162. The economic cost engine 182 receives the GUI difference model 162 and GUI element metadata 140 (1304). The economic cost engine 182 receives a current test script representation 814 that includes a test script statement vector 816 (1306). The script parser logic 812 parses the test script statement vector 816 into vector nodes to determine the GUI objects to which the test script statement vector 816 navigates (1308). The economic cost engine 182 invokes the OR lookup logic 172 for each GUI object identified by the test script statement vector 816 to retrieve the properties of the GUI objects from the object repository 174 (1310). The path traversal logic 824 analyzes the navigation path of the GUI element difference entries 810 that correspond to the GUI objects identified by the test script statement vector 816 (1312). The economic cost model logic 196 validates a GAP change specifier 184 and/or determines the type of synthetic GAP change specifier 185 to generate (1314). The economic cost model logic 196 generates a synthetic GAP change specifier 185 corresponding to the type of GUI element change identified by analyzing the current test script 164, current GAP version 150 (e.g., current GAP tree model) and GUI difference model 162 (1316). The economic cost model logic 196 locates, in the economic model specified by the model specifier 868, the GUI element change cost rule 846 corresponding to the GAP change specifier 184 and/or synthetic GAP change specifier 185 and applies the GUI element change cost rule 846 to obtain the GUI transformation cost 848 (1318). The economic cost model logic 196 generates the test script transformation cost report 186 based on the GUI transformation cost 848 (1320).

In one implementation, the economic cost engine architecture 110 uses adaptive programming including class and object graphs and an abstraction that treats all objects uniformly. The path traversal logic 824 and the economic cost model logic 196 may distinguish complex and simple types of GUI objects. Complex types contain fields while simple types do not. Let T be finite sets of type names and F of field names or labels, and two distinct symbols this $\in$ F and $\diamond \in$ F. Type graphs are directed graphs G=(V, E, L) such that:

$V \subseteq T$, the nodes are type names;

$L \subseteq F$, edges are labeled by field names, or "$\diamond$" where fields do not have names. Edges that are labeled by "$\diamond$" are called aggregation edges, and edges that are labeled by field names reference edges. The difference between aggregation and reference edges becomes clear with the following example. Fields of classes in object-oriented languages designate instances of some classes, and these fields have names that are used to reference the fields. Each field of a class is defined by the name of the field and the name of the class (type) that this field is an instance of. The name of a field is the label of the corresponding reference edge in the type graph.

When a class designates a GUI object $o_k$ and the other class designates a GUI object $o_n$ that is contained in the object $o_k$, the type graph has two nodes, one for the object $o_k$ and the other for the object $o_n$ that the object $o_k$ contains. The names of the corresponding classes serve as their types. The relation between two nameless objects is represented using the edge labeled with the "$\diamond$" in the type graph.

$E \subseteq L \times V \times V$, edges are cross-products of labels and nodes;

for each $v \in V$, the labels of all outgoing edges with the exception of "$\diamond$" are distinct;

for each $v \in V$, where v represents a concrete type, $$v \xrightarrow{this} v \in E.$$

An object graph is a labeled directed graph O=(V', E', L') that is an instance of a type graph G=(V, E, L) under a given function Class that maps objects to their classes, if the following conditions are satisfied:

for all objects $o \in V'$, o is an instance of the concrete type given by function Class(o);

for each object $o \in V'$, the labels of its outgoing reference edges are exactly those of the set of labels of references of Class(o) including edges and their labels inherited from parent classes;

for each edge $$o \xrightarrow{e} o' \in E',$$

Class(o) has a reference edge $$v \xrightarrow{e} u$$

such that v is a parent type of Class(o) and u is a parent type of Class(o').

An object graph is a model of the objects, represented in GAPs, and their references to each other. A collection of fields in an object graph is a set of edges labeled by field names. A collection of aggregated objects in an object graph is a set of edges labeled by "◇". A path in a type graph G=(V, E, L) is a sequence of nodes and labels $p_G=(v_0e_1,v_1e_2, \ldots e_nv_n)$, where $v_i \in V$ and $$v_i \xrightarrow{ei+1} v_i+1$$

for $0 \leq i \leq n$. A concrete path is defined as an alternating sequence of type names and labels designating reference edges. In general a concrete path $p_c$ is a subset of the corresponding type path $p_G$, i.e. $p_c \subset p_G$.

An object graph has the special object $o_r \in V'$, Or is a collection of root objects $o_r \subset V'$ in the object graph O given by function root: $O \rightarrow o_r$. This object has type Class($o_r$)=root and its relation with objects in its collection is expressed via $o_r \rightarrow \diamond \rightarrow o' \in E'$.

Given an object o of some type the traversal logic 824 and the economic cost model logic 196 work together to identify one or more reachable objects that satisfy certain criteria. The task performed is equivalent to determining whether test script statement vectors 816 that describe navigation paths are valid. Navigation paths specified in test script statement vectors 816 can be thought of as specification of constraints for the object reach-ability problem. Finding reachable objects is done via traversals. The traversal of an edge labeled e corresponds to retrieving the value of the e field. Every edge in the object graph is an image of a has-part edge in the type graph: there is an edge $e(o_1, o_2)$ in O only when there exist types $v_1$ and $v_2$ such that object $o_1$ is of type $v_1$, $v_1$ has an e-part of type $v_2$, and $o_2$ is of type $v_2$.

The first node of a path p is called the source of p and the last node is called the destination of p. A traversal of an object graph O started with an object $v_i$ and guided by paths from a set of paths p is done by performing depth-first search on O with p used to prune the search. The resulting traversal history is a depth-first traversal of the object graph along object paths agreeing with the given concrete path set.

The problem of identifying all reachable objects from a given object o that satisfy certain criteria is formalized as follows. For each pair of classes c and c', a set of edges e may be identified by computing FIRST(c, c') if it is possible for an object of type c to reach an object of type c' by a path beginning with an edge e. More precisely, FIRST(c, c')=e∈E, such that there exists an object graph O of C and objects o and o' such that: 1) Class(o)=c; 2) Class(o')=c'; and 3) o e*o'.

The last condition, o e* o' indicates that there is ($\exists$) a path from o to o' in the object graph, consisting of an edge labeled e, followed by any sequence of edges in the graph. The lack of information about the actual graph is represented by the existential operator $\exists$ ..

The task of static checking of test scripts (e.g., transformed test scripts 178) is greatly simplified when the names of foreign components names are defined as string constants. When the names of GUI objects are specified using expressions, the values of these expressions may not be determined until run-time. Type graphs facilitate the economic engine system 800 to infer types of expressions and variables that hold the names of GUI objects. The economic engine system 800 applies concepts based on the Traversal Graph Analysis (TGA) defined in adaptive programming to infer types of expressions and variables.

An adaptive strategy S=(R, π, δ) represents paths in an object graph, where R={s, d}, where s and d are the source and destination GUI objects of a path in an object graph, and $R \subset O$, where O is the set of objects in a type graph, π={e, α}, where e is a set of fields and α is a set of variables that designate a set of some edges α ⊂ e, and δ={→ ,→ } is a set of transition edges representing objects and attributes respectively. Each element in a strategy S is either the name of some object or a variable designating an object and/or attributes.

The expression π(o, o') designates a set of objects {o'}, such that each object o' of the set is a part of the object o expressed by some edge e∈π such that e(o, o'). For example, test script statements may be considered strategies that define strategy graph edges a → b and a → b for test script statements Window("a").VBWindow("b") and Window("a").VBWindow("b").property("ReadOnly"), respectively. Thus, a strategy is an abstraction of test script statements, as well as an abstraction of a set of paths in a type graph.

For example, a type graph of an organizational structure of a company may include: a CEO as a root type of some GUI object that contains the GUI object stock of type integer and aggregates type CTO. CTO is a type that has GUI objects salary of type Check and boss of type CEO. Type Check has in turn fields amount of type float and issuer of type CEO. A strategy CEO → α1 → α2 → amount for the test script statement:

Window("CEO").Window(strex1).Window(strexp2).prop-erty("amount") for the type graph described above designates strategy S, where s=CEO, d=amount, α1 is a variable designating objects computed via string expression strexp1, and α2 is a variable designating attribute object computed via string expression strexp2. Computing π(CEO, o') the type {CTO} is obtained, and computing π(CTO, o') the types {CEO,check} are obtained.

Each node in a strategy is assigned a distinct sequence number, and nodes are expressed as pairs (i, π). Given functions Δi: N×N→δ and Δπ: π×π→δ and two sequential natural numbers k and k+1, the function Δi computes the transition edge between nodes that are assigned these numbers in S, and Ø if there is no transition edge. Correspondingly, given two nodes $π_q$ and $π_r$ in some type graph, function Δπ computes the transition edge between nodes, and Ø if there is no transition edge.

When the values of string expressions in test scripts statements cannot be computed until run-time, the string expressions may be inferred. The path traversal logic 824 and the economic cost model logic 196 work together to analyze test script statements vectors 816, using type graphs by transforming test script statements vectors 816 into an adaptive strategy with variables replacing string expressions. The economic cost model logic 196 computes possible values for each variable and generates traversal paths for each strategy. Where at least one path is identified, then a corresponding GAP change specifier 184 is validated and/or a synthetic GAP change specifier 185 is generated, since values of expressions that compute names of objects may not be in the computed paths.

The path traversal logic 824 identifies one or more possible paths, while the economic cost model logic 196 validates paths for the expressions and statements. The economic cost model logic 196 computes the set of edges e for each pair of classes c and c', by computing FIRST(c, c') where an object of type c exists that can reach an object of type c' by a path beginning with an edge e. Recall from above that FIRST(c, c')=e $\in$ E, such that there exists an object graph O of C and objects o and o' such that: 1) Class(o)=c; 2) Class(o')=c'; and 3) o e* o'.

The last condition, o e* o' says that there is ($\exists$) a path from o to o' in the object graph, consisting of an edge labeled e, followed by any sequence of edges in the graph. In one implementation, the method FIRST is implemented using two sets of logic: path traversal logic 824 and GUI class rules logic 828.

The path traversal logic 824 takes the set R of source and destination components in S and set π as input parameters. The path traversal logic 824 outputs a tree of valid paths in a type graph that satisfy a given strategy. Some of the input components may not make it into the path tree because they do not start any valid paths.

In one implementation, the path traversal logic 824 invokes the economic cost model logic 196, which in turn recursively calls itself. The economic cost model logic 196 uses three parameters: a component o that is a potential current node in the path, sequence number i of the node in the strategy S, and the transition edge δ between nodes in S that are assigned two sequential natural numbers i and i+1. The goal of the GUI class rules logic 828 is to color the potential current node o in the path as either red or blue. Where colored red object o is considered a dead end on the path in the type graph that does not lead to the designated destination nodes. Otherwise, the node is colored blue and this color is propagated up to the source nodes which are subsequently included in the path tree.

The economic cost model logic 196 completes when the sequence number i is equal to or the greater of the number of nodes in the strategy, |π|, and/or where there is no transition edge from the current node. When the economic cost model logic 196 completes, the economic cost model logic 196 colors the current node blue. In the calling procedure the color of the node is checked, and where the node is blue, then node is attached to its parent node in the path tree.

In one implementation, the economic cost model logic 196 computes the set of edges e for each pair of classes c and c', where an object of type c is identified that can reach an object of type c' by a path beginning with an edge e. The logic is applied individually to each test script statement vector 816 in which foreign GAP objects are specified using string expressions whose values are not known before the current test script 164 is executed. The economic cost model logic 196 infers possible names of foreign objects that string expressions may evaluate to at runtime.

TABLE 9

Path Traversal and GUI class rules logic

Path traversal logic (R $\in$ S, π $\in$ S)
for all s $\in$ R do
  economic cost model logic (s, 0, Δi(0,1))
  if color(s) = red then
    remove s from R TABLE 9-continued Path Traversal and GUI class rules logic end if
end for
economic cost model logic (o $\in$ O, i $\in$ N, $\partial$ $\in$ δ)
if i $\geq$ |π| or $\partial$ = ∅ then
  color(o) $\mapsto$ blue
else
  for all o' $\in$ πi(o, o') do
    if Δπ(o,o') = $\partial$ then
      economic cost model logic (o', i + 1, Δi(i, i + 1))
      if color(o') = blue then
        AddChildToTree(o, o')
      end if
    end if
  end for
  if children(o) = ∅ then
    color(o) $\mapsto$ red
  else
    color(o) $\mapsto$ blue
  end if
end if Often the same string expressions are used in different statements in the same scripting scope. The same expressions compute the same values, where the expressions are located in the same scope, provided that the values of the variables used in these expressions are not changed. Using program analysis techniques the path traversal logic 824, and the economic cost model logic 196 work together to detect expressions at compile time whose variables are not changed at run-time. The path traversal logic 824 identifies one or more possible names of foreign GUI objects that may be substituted for string expressions in test script statements. While the economic cost model logic 196 identifies from among the possible names of foreign GUI objects, valid GUI objects. Given the same expression used in different test script statements in the same script scope, and provided that the values of the variables used in these expressions are not changed by other expressions executed between these statements, the economic cost model logic 196 identifies a set of names of foreign GUI objects computed by these string expressions. This set of GUI objects is obtained by taking the intersection of the sets of names computed by the path traversal logic 824.

For example, consider the strategy graph S1 CEO $\to$ $\alpha 1 \to \alpha 2 \to$ amount for the type graph for the test script statement expression: Window("CEO").Window(strexp1).Window(strexp2).property("amount"). The economic cost model logic 196 computes values for type scheme variables $\alpha 1$={CTO} and $\alpha 2$={boss, salary}.

Suppose a different strategy graph S2 exists, where Programmer $\to \alpha 2 \to$ bonus for y["Programmer"][strexp2].attribute("bonus") for some other type graph. Notice that the string expression variable strexp2 is the same in both statements, and because of that the string expression variable strexp2 is designated by the same type scheme variables in both the strategy graphs. Suppose that by applying the path traversal logic 824 that values for type scheme variable $\alpha 2$={salary} are computed. In one implementation, in order to determine the value of variable $\alpha 2$ that satisfies both S1 and S2, the economic cost model logic 196 identifies the intersection of the sets of values of $\alpha 2$ computed for these two strategies. The resulting set $\alpha 2$={salary} is the result of pruning the navigation paths.

This example illustrates the idea of pruning navigation paths using context-sensitive dataflow analysis that may be used by the economic cost model logic 196. By determining definitions and uses of a variable that designate names of GUI objects in a given scope, sets of values are computed for each transformed test script statement in which a variable is used. Then the intersection of these sets is taken to determine common values that this variable can take in the scope considered.

The economic engine system 800 provides modularization integrity as a mechanism for ensuring the validity of GAP change specifiers 184 and/or synthetic GAP change specifiers 185. Modularization integrity specifies that each current test script statement identified by a GAP change specifier 184 and/or a synthetic GAP change specifier 185 to be changed may only communicate directly with the objects that belong to GUIs for which the current test script statement, as changed by the GAP change specifier 184 and/or a synthetic GAP change specifier 185, is created. Compositions of current test script statements changed as specified by GAP change specifiers 184 and/or synthetic GAP change specifiers 185, in which GUI objects are accessed by calling functions exported by the current test script statements changed as specified, should not violate modularization integrity. The economic engine system 800 ensures the modularization integrity of GAP change specifiers 184 and/or synthetic GAP change specifiers 185 by analyzing compositions of current test script statements changed as specified by GAP change specifiers 184 and/or synthetic GAP change specifiers 185 to build the transitive relations between the current test script 164 and the current test script 164 changed as specified by the GAP change specifiers 184 and/or synthetic GAP change specifiers 185.

For example, a statement Func("y", "z"), found in a suite of related test scripts, navigates to the field z of foreign GUI object y in some test scripts that export function Func. Thus, the some test scripts in the suite of related test scripts may violate the modularization integrity by implicitly interoperating the test scripts via the function Func even though this communication may be prohibited by the constraints of a given test suite. In one implementation, the economic engine system 800 encodes modularization constraints when defining test scripts using the keyword constraints as part of a global comment in each test script. These constraints define GAPs and their GUI screens as well as other test scripts with which a given test script may communicate. An example is a statement that specifies a constraint is constraints screen ("Q") test_scripts("P, S"). This constraint effectively prohibits a given test script from communicating with other GAPs, GUI screens, and test scripts, except the screen Q and test scripts P and S, explicitly or implicitly.

The time complexity of the path traversal logic 824 and the economic cost model logic 196 is exponential to the size of the type graph for each test script 164. Because the path traversal logic 824 and the economic cost model logic 196 involve the search of one or more nodes and edges in the type graph that contains cycles for each node in the strategy, the time complexity is $O((V+E)^{max(|\pi|)})$ where V is the number of nodes, E is the number of edges in the type graph, and max ($|\pi|$) is the maximum number of nodes in strategies. The operations of storing successors in the table of variables take $O(1)$. In general, the number of nodes max($|\pi|$) in strategies is much smaller than the number of nodes in type graphs. All graph nodes may not need to be explored for each node in a strategy.

The systems may be implemented in many different ways. For example, although some features are shown stored in computer-readable memories (e.g., as logic implemented as computer-executable instructions or as data structures in memory), all or part of the systems, logic, and data structures may be stored on, distributed across, or read from other machine-readable media. The media may include hard disks, floppy disks, CD-ROMs, a signal, such as a signal received from a network or partitioned into sections and received in multiple packets communicated across a network. The systems may be implemented in software, hardware, or a combination of software and hardware.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

While various embodiments have been described, it will be apparent to those of ordinary skill in the art that many more embodiments and implementations are possible within the scope of the invention. Accordingly, the invention is not to be restricted except in light of the attached claims and their equivalents.

What is claimed is:

1. A product for test script transformation cost analysis for generating a test script transformation cost report for a subsequent graphical user interface application (GAP) version arising from a current GAP version to determine the resources and time needed to produce a transformed test script and perform testing of the subsequent GAP, the product comprising:

a non-transitory computer readable storage medium;
economic cost model logic stored on the transitory computer readable storage medium operable to:
receive a GAP change specifier,
wherein the GAP change specifier includes a GUI change frequency that indicates a number of occurrences of a particular GUI element change,
wherein the economic cost model logic is further operable to apply an efficiency factor indicates whether the GUI change frequency above a particular threshold results in a lower GUI transformation cost;
search an economic model repository for an applicable GUI element change cost rule;
apply the cost rule to obtain a GUI transformation cost; and
generate the test script transformation cost report based on the GUI transformation cost.

2. The product of claim 1, wherein the GAP change specifier is a wrong path-delete type change specifier, wherein the wrong path-delete type change specifier indicates that a first GUI element of the current GAP version is deleted from the subsequent GAP version.

3. The product of claim 1, wherein the GAP change specifier is a wrong path-same type change specifier, wherein the wrong path-same type change specifier indicates that a first GUI element of the current GAP version and a second GUI element of the subsequent GAP version have matching identifiers but the first and the second GUI elements do not represent the same GUI element.

4. The product of claim 1, wherein the GAP change specifier is a changed-element type change specifier, wherein the changed-element type change specifier indicates that a first GUI element of the current GAP version and a second GUI element of the subsequent GAP version have matching identifiers that represent the same GUI element, but at least one attribute of the first GUI element and the second GUI element are different.

5. The product of claim 1, wherein the GAP change specifier indicates a percentage of GUI elements to be changed.

6. The product of claim 5, wherein the economic cost model logic is further operable to apply an efficiency factor based on the percentage of GUI elements to be changed.

7. The product of claim 1, wherein the GUI element change cost rule comprises:
a change specifier identifier;
a system resource utilization identifier;
an estimate of time to complete a change identified by the change specifier identifier; and
a dependent change specifier identifier that identifies another change that depends on the change identified by the change specifier identifier.

8. The product of claim 7, wherein the GUI element change cost rule further comprises: a dependency ranking for the change; a quality ranking for the change; and a complexity ranking for the change.

9. A system for test script transformation cost analysis for generating a test script transformation cost report for a subsequent graphical user interface application (GAP) version arising from a current GAP version to determine the resources and time needed to produce a transformed test script and perform testing of the subsequent GAP, the system comprising:
a processor;
a memory coupled to the processor, the memory comprising:
economic cost model logic operable to:
receive a GAP change specifier,
wherein the GAP change specifier includes a GUI change frequency that indicates a number of occurrences of a particular GUI element change,
wherein the economic cost model logic is further operable to apply an efficiency factor indicates whether the GUI change frequency above a particular threshold results in a lower GUI transformation cost;
search an economic model repository for an applicable GUI element change cost rule;
apply the cost rule to obtain a GUI transformation cost; and
generate the test script transformation cost report based on the GUI transformation cost.

10. The system of claim 9, wherein the GAP change specifier is a wrong path-delete type change specifier, wherein the wrong path-delete type change specifier indicates that a first GUI element of the current GAP version is deleted from the subsequent GAP version.

11. The system of claim 9, wherein the GAP change specifier is a wrong path-same type change specifier, wherein the wrong path-same type change specifier indicates that a first GUI element of the current GAP version and a second GUI element of the subsequent GAP version have matching identifiers but the first and the second GUI elements do not represent the same GUI element.

12. The system of claim 9, wherein the GAP change specifier is a changed-element type change specifier, wherein the changed-element type change specifier indicates that a first GUI element of the current GAP version and a second GUI element of the subsequent GAP version have matching identifiers that represent the same GUI element, but at least one attribute of the first GUI element and the second GUI element are different.

13. The system of claim 9, wherein the change specifier indicates a percentage of GUI elements to be changed.

14. The system of claim 13, wherein the economic cost model logic is further operable to apply an efficiency factor based on the percentage of GUI elements to be changed.

15. The system of claim 9, wherein the GUI element change cost rule comprises:
a change specifier identifier;
a system resource utilization identifier;
an estimate of time to complete a change identified by the change specifier identifier; and
a dependent change specifier identifier that identifies another change that depends on the change identified by the change specifier identifier.

16. The system of claim 15, wherein the GUI element change cost rule further comprises:
a dependency ranking for the change;
a quality ranking for the change; and
a complexity ranking for the change.

17. A product for test script transformation cost analysis for generating a test script transformation cost report for a subsequent graphical user interface application (GAP) version arising from a current GAP version to determine the resources and time needed to produce a transformed test script and perform testing of the subsequent GAP, the product comprising:
a non-transitory computer readable storage medium;
economic cost model logic stored on the transitory computer readable storage medium operable to:
receive a GAP change specifier,
wherein the GAP change specifier is a wrong path-delete type change specifier, wherein the wrong path-delete type change specifier indicates that a first GUI element of the current GAP version is deleted from the subsequent GAP version, or
wherein the GAP change specifier is a wrong path-same type change specifier, wherein the wrong path-same type change specifier indicates that a first GUI element of the current GAP version and a second GUI element of the subsequent GAP version have matching identifiers but the first and the second GUI elements do not represent the same GUI element, or
wherein the GAP change specifier is a changed-element type change specifier, wherein the changed-element type change specifier indicates that a first GUI element of the current GAP version and a second GUI element of the subsequent GAP version have matching identifiers that represent the same GUI element, but at least one attribute of the first GUI element and the second GUI element are different;
search an economic model repository for an applicable GUI element change cost rule;
apply the cost rule to obtain a GUI transformation cost; and
generate the test script transformation cost report based on the GUI transformation cost.

18. A system for test script transformation cost analysis for generating a test script transformation cost report for a subsequent graphical user interface application (GAP) version arising from a current GAP version to determine the resources and time needed to produce a transformed test script and perform testing of the subsequent GAP, the system comprising:
- a processor;
- a memory coupled to the processor, the memory comprising:
  - economic cost model logic operable to:
    - receive a GAP change specifier,
      - wherein the GAP change specifier is a wrong path-delete type change specifier, wherein the wrong path-delete type change specifier indicates that a first GUI element of the current GAP version is deleted from the subsequent GAP version, or
      - wherein the GAP change specifier is a wrong path-same type change specifier, wherein the wrong path-same type change specifier indicates that a first GUI element of the current GAP version and a second GUI element of the subsequent GAP version have matching identifiers but the first and the second GUI elements do not represent the same GUI element, or
      - wherein the GAP change specifier is a changed-element type change specifier, wherein the changed-element type change specifier indicates that a first GUI element of the current GAP version and a second GUI element of the subsequent GAP version have matching identifiers that represent the same GUI element, but at least one attribute of the first GUI element and the second GUI element are different;
    - search an economic model repository for an applicable GUI element change cost rule;
    - apply the cost rule to obtain a GUI transformation cost; and
    - generate the test script transformation cost report based on the GUI transformation cost.

* * * * *

UNITED STATES PATENT AND TRADEMARK OFFICE
CERTIFICATE OF CORRECTION

PATENT NO. : 8,458,662 B2
APPLICATION NO. : 12/038675
DATED : June 4, 2013
INVENTOR(S) : Mark Grechanik et al.

It is certified that error appears in the above-identified patent and that said Letters Patent is hereby corrected as shown below:

In the Specification

In column 35, line 32, after "V'," replace "Or is a" with --$O_r$ is a--.

In column 36, line 42, after "(strexp2)." replace "prop-erty" with --property--.

In column 38, line 43, after "strategy graph" replace "S1" with --S1-- (no bold).

In column 38, line 49, after "strategy graph" replace "S2" with --S2-- (no bold).

In column 38, line 58, after "satisfies both" replace "S1" with --S1-- (no bold).

In column 38, line 59, before "the economic cost model" replace "S2," with --S2,-- (no bold).

Signed and Sealed this
Eighth Day of October, 2013

Teresa Stanek Rea
*Deputy Director of the United States Patent and Trademark Office*